(12) United States Patent
Pavlovskaia et al.

(10) Patent No.: US 12,265,573 B2
(45) Date of Patent: *Apr. 1, 2025

(54) AUTOMATED LOCAL STORY GENERATION AND CURATION

(71) Applicant: Snap Inc., Santa Monica, CA (US)

(72) Inventors: Maria Pavlovskaia, San Francisco, CA (US); Evan Spiegel, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,312

(22) Filed: Sep. 16, 2022

(65) Prior Publication Data

US 2023/0080722 A1    Mar. 16, 2023

Related U.S. Application Data

(63) Continuation of application No. 16/786,933, filed on Feb. 10, 2020, now Pat. No. 11,449,539, which is a
(Continued)

(51) Int. Cl.
*G06F 16/48* (2019.01)
*G06F 16/29* (2019.01)
(Continued)

(52) U.S. Cl.
CPC .............. *G06F 16/48* (2019.01); *G06F 16/29* (2019.01); *G06F 16/40* (2019.01); *G06F 16/435* (2019.01);
(Continued)

(58) Field of Classification Search
CPC ........ G06F 16/29; G06F 16/40; G06F 16/435; G06F 16/437; G06F 16/48; G06F 16/483;
(Continued)

(56) References Cited

U.S. PATENT DOCUMENTS

| 666,223 A | 1/1901 | Shedlock |
| 4,581,634 A | 4/1986 | Williams |
| (Continued) | | |

FOREIGN PATENT DOCUMENTS

| CA | 2887596 A1 | 7/2015 |
| CN | 1645366 A | 7/2005 |
| (Continued) | | |

OTHER PUBLICATIONS

U.S. Appl. No. 14/704,188 U.S. Pat. No. 9,881,094, filed May 5, 2015, Systems and Methods for Automated Local Story Generation and Curation.

(Continued)

*Primary Examiner* — Chau T Nguyen
(74) *Attorney, Agent, or Firm* — SCHWEGMAN LUNDBERG & WOESSNER, P.A.

(57) ABSTRACT

Systems and methods for automated local story generation and curation are described. In one example embodiment, a server computer receives content from client devices, and processes the content to identify content characteristics. Stories are then generated based on the characteristics of the received content, and the stories are communicated to client devices. In certain embodiments, selection at a client device of an individual piece of content within a story may further be used by the system to provide the client device with a sub-story that includes pieces of content sharing content characteristics with the characteristics of the selected image or video.

17 Claims, 14 Drawing Sheets

Related U.S. Application Data continuation of application No. 15/853,609, filed on Dec. 22, 2017, now Pat. No. 10,592,574, and a continuation of application No. 15/853,619, filed on Dec. 22, 2017, now Pat. No. 11,392,633, which is a continuation of application No. 14/704,188, filed on May 5, 2015, now Pat. No. 9,881,094, said application No. 15/853,609 is a continuation of application No. 14/704,188, filed on May 5, 2015, now Pat. No. 9,881,094.

(51) Int. Cl.
*G06F 16/40* (2019.01)
*G06F 16/435* (2019.01)
*G06F 16/487* (2019.01)
*G06F 16/9537* (2019.01)
*G06F 40/10* (2020.01)
*G06F 40/189* (2020.01)

(52) U.S. Cl.
CPC .......... *G06F 16/437* (2019.01); *G06F 16/487* (2019.01); *G06F 16/489* (2019.01); *G06F 16/9537* (2019.01); *G06F 40/10* (2020.01); *G06F 40/189* (2020.01)

(58) Field of Classification Search
CPC .. G06F 16/487; G06F 16/489; G06F 16/9535; G06F 16/9537; G06F 40/10; G06F 40/20; G06F 40/189
See application file for complete search history.

(56) References Cited

U.S. PATENT DOCUMENTS

| | | | |
|---|---|---|---|
| 4,975,690 A | 12/1990 | Torres | |
| 5,072,412 A | 12/1991 | Henderson, Jr. et al. | |
| 5,493,692 A | 2/1996 | Theimer et al. | |
| 5,713,073 A | 1/1998 | Warsta | |
| 5,754,939 A | 5/1998 | Herz et al. | |
| 5,855,008 A | 12/1998 | Goldhaber et al. | |
| 5,883,639 A | 3/1999 | Walton et al. | |
| 5,999,932 A | 12/1999 | Paul | |
| 6,012,098 A | 1/2000 | Bayeh et al. | |
| 6,014,090 A | 1/2000 | Rosen et al. | |
| 6,029,141 A | 2/2000 | Bezos et al. | |
| 6,038,295 A | 3/2000 | Mattes | |
| 6,049,711 A | 4/2000 | Yehezkel et al. | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,285,381 B1 | 9/2001 | Sawano et al. | |
| 6,285,987 B1 | 9/2001 | Roth et al. | |
| 6,310,694 B1 | 10/2001 | Okimoto et al. | |
| 6,317,789 B1 | 11/2001 | Rakavy et al. | |
| 6,334,149 B1 | 12/2001 | Davis, Jr. et al. | |
| 6,349,203 B1 | 2/2002 | Asaoka et al. | |
| 6,353,170 B1 | 3/2002 | Eyzaguirre et al. | |
| 6,446,004 B1 | 9/2002 | Cao et al. | |
| 6,449,657 B2 | 9/2002 | Stanbach et al. | |
| 6,456,852 B2 | 9/2002 | Bar et al. | |
| 6,484,196 B1 | 11/2002 | Maurille | |
| 6,487,601 B1 | 11/2002 | Hubacher et al. | |
| 6,523,008 B1 | 2/2003 | Avrunin | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,658,095 B1 | 12/2003 | Yoakum et al. | |
| 6,665,531 B1 | 12/2003 | Soderbacka et al. | |
| 6,668,173 B2 | 12/2003 | Greene | |
| 6,684,238 B1 | 1/2004 | Dutta | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,720,860 B1 | 4/2004 | Narayanaswami | |
| 6,724,403 B1 | 4/2004 | Santoro et al. | |
| 6,757,713 B1 | 6/2004 | Ogilvie et al. | |
| 6,832,222 B1 | 12/2004 | Zimowski | |
| 6,834,195 B2 | 12/2004 | Brandenberg et al. | |
| 6,836,792 B1 | 12/2004 | Chen | |
| 6,898,626 B2 | 5/2005 | Ohashi | |
| 6,959,324 B1 | 10/2005 | Kubik et al. | |
| 6,970,088 B2 | 11/2005 | Kovach | |
| 6,970,907 B1 | 11/2005 | Ullmann et al. | |
| 6,980,909 B2 | 12/2005 | Root et al. | |
| 6,981,040 B1 | 12/2005 | Konig et al. | |
| 7,020,494 B2 | 3/2006 | Spriestersbach et al. | |
| 7,027,124 B2 | 4/2006 | Foote et al. | |
| 7,043,555 B1 | 5/2006 | McClain et al. | |
| 7,072,963 B2 | 7/2006 | Anderson et al. | |
| 7,085,571 B2 | 8/2006 | Kalhan et al. | |
| 7,110,744 B2 | 9/2006 | Freeny, Jr. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,188,143 B2 | 3/2007 | Szeto | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,237,002 B1 | 6/2007 | Estrada et al. | |
| 7,240,089 B2 | 7/2007 | Boudreau | |
| 7,269,426 B2 | 9/2007 | Kokkonen et al. | |
| 7,280,658 B2 | 10/2007 | Amini et al. | |
| 7,315,823 B2 | 1/2008 | Brondrup | |
| 7,349,768 B2 | 3/2008 | Bruce et al. | |
| 7,356,564 B2 | 4/2008 | Hartselle et al. | |
| 7,394,345 B1 | 7/2008 | Ehlinger et al. | |
| 7,411,493 B2 | 8/2008 | Smith | |
| 7,423,580 B2 | 9/2008 | Markhovsky et al. | |
| 7,454,442 B2 | 11/2008 | Cobleigh et al. | |
| 7,508,419 B2 | 3/2009 | Toyama et al. | |
| 7,512,649 B2 | 3/2009 | Faybishenko et al. | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,607,096 B2 | 10/2009 | Oreizy et al. | |
| 7,639,943 B1 | 12/2009 | Kalajan | |
| 7,650,231 B2 | 1/2010 | Gadler | |
| 7,668,537 B2 | 2/2010 | DeVries | |
| 7,770,137 B2 | 8/2010 | Forbes et al. | |
| 7,778,973 B2 | 8/2010 | Choi | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 8,001,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,090,351 B2 | 1/2012 | Klein | |
| 8,098,904 B2 | 1/2012 | Ioffe et al. | |
| 8,099,109 B2 | 1/2012 | Altman et al. | |
| 8,112,716 B2 | 2/2012 | Kobayashi | |
| 8,131,597 B2 | 3/2012 | Hudetz | |
| 8,135,166 B2 | 3/2012 | Rhoads | |
| 8,136,028 B1 | 3/2012 | Loeb et al. | |
| 8,146,001 B1 | 3/2012 | Reese | |
| 8,161,115 B2 | 4/2012 | Yamamoto | |
| 8,161,417 B1 | 4/2012 | Lee | |
| 8,195,203 B1 | 6/2012 | Tseng | |
| 8,199,747 B2 | 6/2012 | Rojas et al. | |
| 8,208,943 B2 | 6/2012 | Petersen | |
| 8,214,443 B2 | 7/2012 | Hamburg | |
| 8,234,350 B1 | 7/2012 | Gu et al. | |
| 8,276,092 B1 | 9/2012 | Narayanan et al. | |
| 8,279,090 B2 | 10/2012 | Becker | |

(56) References Cited

U.S. PATENT DOCUMENTS

| | | |
|---|---|---|
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,639,767 B1 | 1/2014 | Harris et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,849,829 B2 | 9/2014 | Shalabi et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,965,409 B2 | 2/2015 | Abhyanker |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,110,977 B1 * | 8/2015 | Pierre ............... G06F 16/48 |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,256,761 B1 | 2/2016 | Sahu et al. |
| 9,258,459 B2 | 2/2016 | Hartley |
| 9,311,384 B1 * | 4/2016 | Jain .................. G06F 16/95 |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,418,482 B1 | 8/2016 | Yang et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,552,399 B1 | 1/2017 | Browning et al. |
| 9,628,950 B1 | 4/2017 | Noeth et al. |
| 9,652,475 B2 | 5/2017 | Shakib et al. |
| 9,710,821 B2 | 7/2017 | Heath |
| 9,854,219 B2 | 12/2017 | Sehn |
| 9,881,094 B2 | 1/2018 | Pavlovskaia |
| 9,952,742 B2 | 4/2018 | Plesur et al. |
| 10,223,438 B1 | 3/2019 | Xu et al. |
| 10,592,574 B2 | 3/2020 | Pavlovskaia et al. |
| 11,392,633 B2 | 7/2022 | Pavlovskaia et al. |
| 11,449,539 B2 | 9/2022 | Pavlovskaia et al. |
| 2002/0047868 A1 | 4/2002 | Miyazawa |
| 2002/0053078 A1 | 5/2002 | Holtz et al. |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0131362 A1 | 7/2003 | Jasinschi et al. |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0007901 A1 | 1/2006 | Roskowski et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |

(56) References Cited

U.S. PATENT DOCUMENTS

| | | |
|---|---|---|
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0082499 A1 | 4/2008 | Koski |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Årankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0164641 A1 | 6/2009 | Rogers et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0083124 A1 | 4/2010 | Druzgalski et al. |
| 2010/0100537 A1 | 4/2010 | Druzgalski et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0177938 A1 | 7/2010 | Martinez et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2010/0313009 A1 | 12/2010 | Combet et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0099199 A1 | 4/2011 | Stalenhoef et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0173150 A1 | 7/2011 | Van Zwol et al. |

(56) References Cited

U.S. PATENT DOCUMENTS

| | | |
|---|---|---|
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0283210 A1 | 11/2011 | Berger et al. |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0082401 A1 | 4/2012 | Berger et al. |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0158527 A1* | 6/2012 | Cannelongo ........ G06F 16/7844 707/748 |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0311465 A1* | 12/2012 | Nealer ................ G06F 16/9537 715/760 |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0046823 A1 | 2/2013 | Mitchell et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173531 A1 | 7/2013 | Rinearson et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0025734 A1 | 1/2014 | Griffin |
| 2014/0032682 A1 | 1/2014 | Prado et al. |
| 2014/0040712 A1 | 2/2014 | Chang et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0067901 A1 | 3/2014 | Shaw et al. |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129331 A1 | 5/2014 | Spivack |
| 2014/0129953 A1 | 5/2014 | Spiegel |
| 2014/0136328 A1* | 5/2014 | Abhyanker ........ G06Q 30/0261 705/14.58 |
| 2014/0143143 A1 | 5/2014 | Fasoli et al. |
| 2014/0149519 A1 | 5/2014 | Redfern et al. |

(56) References Cited

U.S. PATENT DOCUMENTS

| | | |
|---|---|---|
| 2014/0155102 A1 | 6/2014 | Cooper et al. |
| 2014/0164118 A1 | 6/2014 | Polachi |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0214883 A1 | 7/2014 | Sanderson et al. |
| 2014/0222564 A1 | 8/2014 | Kranendonk et al. |
| 2014/0229835 A1* | 8/2014 | Ravine .................. H04L 65/61 709/206 |
| 2014/0236673 A1 | 8/2014 | Smith et al. |
| 2014/0250126 A1 | 9/2014 | Baldwin et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0278769 A1 | 9/2014 | Mccandless |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280501 A1 | 9/2014 | Turner, Jr. |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0358885 A1 | 12/2014 | Zhou et al. |
| 2015/0006237 A1 | 1/2015 | Beck et al. |
| 2015/0012593 A1 | 1/2015 | Phillips et al. |
| 2015/0020086 A1 | 1/2015 | Chen et al. |
| 2015/0046278 A1 | 2/2015 | Pei et al. |
| 2015/0058079 A1 | 2/2015 | Freund et al. |
| 2015/0071619 A1 | 3/2015 | Brough |
| 2015/0081723 A1 | 3/2015 | Ogawa |
| 2015/0081797 A1* | 3/2015 | Ogawa .................. G06F 16/955 709/205 |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169694 A1 | 6/2015 | Longo et al. |
| 2015/0169827 A1 | 6/2015 | Laborde |
| 2015/0170039 A1 | 6/2015 | Hostyn et al. |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0234787 A1 | 8/2015 | Itamoto |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365447 A1 | 12/2015 | Klein |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0042075 A1 | 2/2016 | Brett et al. |
| 2016/0065641 A1* | 3/2016 | Chesluk ................ H04L 65/612 709/219 |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0203143 A1 | 7/2016 | Kritt et al. |
| 2016/0239248 A1 | 8/2016 | Sehn |
| 2016/0277419 A1 | 9/2016 | Allen et al. |
| 2016/0321708 A1 | 11/2016 | Sehn |
| 2016/0328360 A1 | 11/2016 | Pavlovskaia et al. |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |
| 2018/0121450 A1 | 5/2018 | Pavlovskaia et al. |
| 2018/0121451 A1 | 5/2018 | Pavlovskaia et al. |
| 2020/0175086 A1 | 6/2020 | Pavlovskaia et al. |

FOREIGN PATENT DOCUMENTS

| | | | |
|---|---|---|---|
| CN | 101068347 A | 11/2007 | |
| CN | 101292238 A | 10/2008 | |
| CN | 101374214 A | 2/2009 | |
| CN | 107710188 A | 2/2018 | |
| CN | 107710188 B | 6/2021 | |
| CN | 113282771 A | 8/2021 | |
| EP | 2051480 A1 | 4/2009 | |
| EP | 2151797 A1 | 2/2010 | |
| GB | 2399928 A | 9/2004 | |
| KR | 19990073076 A | 10/1999 | |
| KR | 20010078417 A | 8/2001 | |
| KR | 102117056 B1 | 5/2020 | |
| KR | 102248234 B1 | 5/2021 | |
| KR | 102373526 B1 | 3/2022 | |
| KR | 102485919 B1 | 1/2023 | |
| WO | WO-1996024213 A1 | 8/1996 | |
| WO | WO-1999063453 A1 | 12/1999 | |
| WO | WO-2000058882 A1 | 10/2000 | |
| WO | WO-2001029642 A1 | 4/2001 | |
| WO | WO-2001050703 A3 | 7/2001 | |
| WO | WO-2006118755 A2 | 11/2006 | |
| WO | WO-2007092668 A2 | 8/2007 | |
| WO | WO-2009043020 A2 | 4/2009 | |
| WO | WO-2010078573 A3 * | 9/2010 | ........ G06F 17/30274 |
| WO | WO-2011040821 A1 | 4/2011 | |
| WO | WO-2011119407 A1 | 9/2011 | |
| WO | WO-2013008238 A1 | 1/2013 | |
| WO | WO-2013045753 A1 | 4/2013 | |
| WO | WO-2014006129 A1 | 1/2014 | |
| WO | WO-2014068573 A1 | 5/2014 | |
| WO | WO-2014115136 A1 | 7/2014 | |
| WO | WO-2014194262 A2 | 12/2014 | |
| WO | WO-2015192026 A1 | 12/2015 | |
| WO | WO-2016044424 A1 | 3/2016 | |
| WO | WO-2016054562 A1 | 4/2016 | |
| WO | WO-2016065131 A1 | 4/2016 | |
| WO | WO-2016100318 A2 | 6/2016 | |
| WO | WO-2016100318 A3 | 6/2016 | |
| WO | WO-2016100342 A1 | 6/2016 | |
| WO | WO-2016149594 A1 | 9/2016 | |
| WO | WO-2016179166 A1 | 11/2016 | |

OTHER PUBLICATIONS

U.S. Appl. No. 15/853,609 U.S. Pat. No. 10,592,574, filed Dec. 22, 2017, Systems and Methods for Automated Local Story Generation and Curation.

U.S. Appl. No. 15/853,619 U.S. Pat. No. 11,392,633, filed Dec. 22, 2017, Systems and Methods for Automated Local Story Generation and Curation.

U.S. Appl. No. 16/786,933 U.S. Pat. No. 11,449,539, filed Feb. 10, 2020, Automated Local Story Generation and Curation.

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 14/704,188, Final Office Action mailed Feb. 2, 2016", 27 pgs.

"U.S. Appl. No. 14/704,188, Non Final Office Action mailed Jan. 31, 2017", 31 pgs.

"U.S. Appl. No. 14/704,188, Non Final Office Action mailed Jul. 17, 2015", 24 pgs.

"U.S. Appl. No. 14/704,188, Notice of Allowance mailed Sep. 29, 2017", 16 pgs.

"U.S. Appl. No. 14/704,188, Response filed Oct. 19, 2015 to Non Final Office Action mailed Jul. 17, 2015", 11 pgs.

(56) References Cited

OTHER PUBLICATIONS

"U.S. Appl. No. 14/704,188, Response to Non Final Office Action mailed Jan. 31, 2017", 13 pgs.
"U.S. Appl. No. 15/853,609, Final Office Action mailed Aug. 14, 2019", 8 pgs.
"U.S. Appl. No. 15/853,609, Final Office Action mailed Sep. 6, 2018", 23 pgs.
"U.S. Appl. No. 15/853,609, Non Final Office Action mailed Feb. 7, 2019", 19 pgs.
"U.S. Appl. No. 15/853,609, Non Final Office Action mailed Feb. 12, 2018", 24 pgs.
"U.S. Appl. No. 15/853,609, Notice of Allowance mailed Nov. 4, 2019", 6 pgs.
"U.S. Appl. No. 15/853,609, Response filed Jan. 7, 2019 to Final Office Action mailed Sep. 6, 2018", 12 pgs.
"U.S. Appl. No. 15/853,609, Response filed May 14, 2018 to Non Final Office Action mailed Feb. 12, 2018", 12 pgs.
"U.S. Appl. No. 15/853,609, Response filed Oct. 14, 2019 to Final Office Action mailed Aug. 14, 2019", 10 pgs.
"U.S. Appl. No. 15/853,609, Response filed May 7, 2019 to Non Final Office Action mailed Feb. 7, 2019", 14 pgs.
"U.S. Appl. No. 15/853,619, Appeal Brief filed Jul. 19, 2019", 28 pgs.
"U.S. Appl. No. 15/853,619, Appeal Decision mailed Jul. 28, 2021", 11 pgs.
"U.S. Appl. No. 15/853,619, Corrected Notice of Allowability mailed Mar. 17, 2022", 2 pgs.
"U.S. Appl. No. 15/853,619, Examiner Interview Summary mailed Jan. 26, 2022", 2 pgs.
"U.S. Appl. No. 15/853,619, Examiner's Answer to Appeal Brief filed Jul. 19, 2019", 27 pgs.
"U.S. Appl. No. 15/853,619, Final Office Action mailed Oct. 16, 2018", 25 pgs.
"U.S. Appl. No. 15/853,619, Non Final Office Action mailed Feb. 12, 2018", 24 pgs.
"U.S. Appl. No. 15/853,619, Non Final Office Action mailed Oct. 6, 2021", 18 pgs.
"U.S. Appl. No. 15/853,619, Notice of Allowance mailed Mar. 1, 2022", 17 pgs.
"U.S. Appl. No. 15/853,619, Response filed Feb. 3, 2022 to Non Final Office Action mailed Oct. 6, 2021", 10 pgs.
"U.S. Appl. No. 15/853,619, Response Filed Jun. 12, 2018 to Non Final Office Action mailed Feb. 12, 2018", 13 pgs.
"U.S. Appl. No. 16/786,933, Non Final Office Action mailed Sep. 16, 2021", 19 pgs.
"U.S. Appl. No. 16/786,933, Notice of Allowance mailed May 10, 2022", 18 pgs.
"U.S. Appl. No. 16/786,933, Response filed Feb. 14, 2022 to Non Final Office Action mailed Sep. 16, 2021", 11 pgs.
"U.S. Appl. No. 14/704,188, Response filed Jun. 2, 2016 to Final Office Action mailed Feb. 2, 2016", 12 pgs.
"BlogStomp", StompSoftware, [Online] Retrieved from the Internet: <URL: http://stompsoftware.com/blogstomp>, (accessed May 24, 2017), 12 pgs.
"Chinese Application Serial No. 201680034736.8, Office Action mailed Jan. 25, 2021", w/ English Translation, 7 pgs.
"Chinese Application Serial No. 201680034736.8, Office Action mailed Jul. 3, 2020", w/ English translation, 15 pgs.
"Chinese Application Serial No. 201680034736.8, Response filed Mar. 1, 2021 to Office Action mailed Jan. 25, 2021", w/ English Claims, 11 pgs.
"Chinese Application Serial No. 201680034736.8, Response filed Nov. 17, 2020 to Office Action mailed Jul. 3, 2020", w/ English Claims, 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"European Application Serial No. 16789931.9, Communication Pursuant to Article 94(3) EPC Jan. 4, 2019", 5 pgs.
"European Application Serial No. 16789931.9, EPO Written Decision to Refuse mailed Jun. 25, 2021", 15 pgs.
"European Application Serial No. 16789931.9, Extended European Search Report mailed Mar. 14, 2018", 7 pgs.
"European Application Serial No. 16789931.9, Response filed May 7, 2019 to Communication Pursuant to Article 94(3) EPC Jan. 4, 2019", 1 pg.
"European Application Serial No. 16789931.9, Response filed May 10, 2021 to Summons to Attend Oral Proceedings mailed Jan. 20, 2021", 52 pgs.
"European Application Serial No. 16789931.9, Summons to Attend Oral Proceedings mailed Jan. 20, 2021", 6 pgs.
"How we analyzed Twitter social media networks with NodeXL", PewResearchCenter in association with the Social media—Research Foundation, (Feb. 20, 2014), 23 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"International Application Serial No. PCT/US2016/030558, International Preliminary Report on Patentability mailed Nov. 16, 2017", 13 pgs.
"International Application Serial No. PCT/US2016/030558, International Search Report mailed May 31, 2016", 3 pgs.
"International Application Serial No. PCT/US2016/030558, Written Opinion mailed May 31, 2016", 11 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2017-7034976, Notice of Preliminary Rejection mailed Jun. 25, 2019", w/ English Translation, 15 pgs.
"Korean Application Serial No. 10-2017-7034976, Response filed Oct. 25, 2019 to Notice of Preliminary Rejection mailed Jun. 25, 2019", w/ English Claims, 34 pgs.
"Korean Application Serial No. 10-2020-7014942, Notice of Preliminary Rejection mailed Jul. 20, 2020", w/ English translation, 8 pgs.
"Korean Application Serial No. 10-2020-7014942, Response filed Sep. 17, 2020 to Notice of Preliminary Rejection mailed Jul. 20, 2020", w/ English Claims, 28 pgs.
"Korean Application Serial No. 10-2021-7012943, Notice of Preliminary Rejection mailed Jun. 7, 2021", w/ English Translation, 4 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"Surprise!", [Online] Retrieved from the Internet: <URL: https://www.snap.com/en-US/news/post/surprise>, (Oct. 3, 2013), 1 pg.

(56) References Cited

OTHER PUBLICATIONS

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
Han, et al., "Text-Based Twitter User Geolocation Prediction", Journal of Artificial Intelligence Research 49, (2014), 451-500.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV> (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
Yu, et al., "Social network analysis—You Tube", 508 Project Final Report, (Jan. 25, 2008), 25 pgs.
"U.S. Appl. No. 15/853,619, Corrected Notice of Allowability mailed Jun. 17, 2022", 3 pgs.
"Korean Application Serial No. 10-2022-7007703, Response filed Aug. 1, 2022 to Notice of Preliminary Rejection mailed Jun. 22, 2022", w/ English Claims, 13 pgs.
"Korean Application Serial No. 10-2022-7007703, Notice of Preliminary Rejection mailed Jun. 22, 2022", w/ English Translation, 4 pgs.
"Korean Application Serial No. 10-2023-7000269, Notice of Preliminary Rejection mailed Sep. 26, 2023", 8 pgs.
"European Application Serial No. 16789931.9, Summons to Attend Oral Proceedings mailed Oct. 18, 2023", 5 pgs.
"Korean Application Serial No. 10-2023-7000269, Notice of Preliminary Rejection mailed Jul. 23, 2024", w/ English translation, 11 pgs.
"Chinese Application Serial No. 202110607167.4, Office Action mailed Feb. 27, 2024", w/ English translation, 14 pgs.
"Chinese Application Serial No. 202110607167.4, Response filed Jun. 26, 2024 to Office Action mailed Feb. 27, 2024", W/English Claims, 11 pgs.
"European Application Serial No. 24150713.6, Extended European Search Report mailed Apr. 2, 2024", 10 pgs.

\* cited by examiner

AUTOMATED LOCAL STORY GENERATION AND CURATION

PRIORITY

This application is a continuation of and claims the benefit of priority of U.S. patent application Ser. No. 16/786,933, filed on Feb. 10, 2015, which is a continuation of and claims the benefit of priority of U.S. patent application Ser. No. 15/853,609, filed on Dec. 22, 2017, which is a continuation of and claims the benefit of priority of U.S. patent application Ser. No. 14/704,188, filed on May 5, 2015; U.S. patent application Ser. No. 16/786,933 is also a continuation of and claims the benefit of priority of U.S. patent application Ser. No. 15/853,619, filed on Dec. 22, 2017, which is a continuation of U.S. patent application Ser. No. 14/704,188, filed May 5, 2015, which are hereby incorporated by reference herein in their entireties.

BACKGROUND

News stories have traditionally been presented to consumers in a heavily controlled and curated format. Early formats for news presentation included newspapers and magazines. Later formats included broadcast radio and television news. Traditional news sources are typically heavily associated with corporations or well-known persons that gather and present the news stories. In the modern Internet era, many such news sources have fragmented, but core aspects of news gathering and presentation often remain associated with professional journalists gathering and sharing information in a way that is tied to an individual identity. While such practices have been able to support some news structures with valuable analysis, the process for generating stories where select professionals filter information and generate stories is time consuming and introduces significant delay between an event occurring and presentation of information to a news consumer.

Systems and methods described herein relate to automated local story generation, curation, and presentation from received content.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
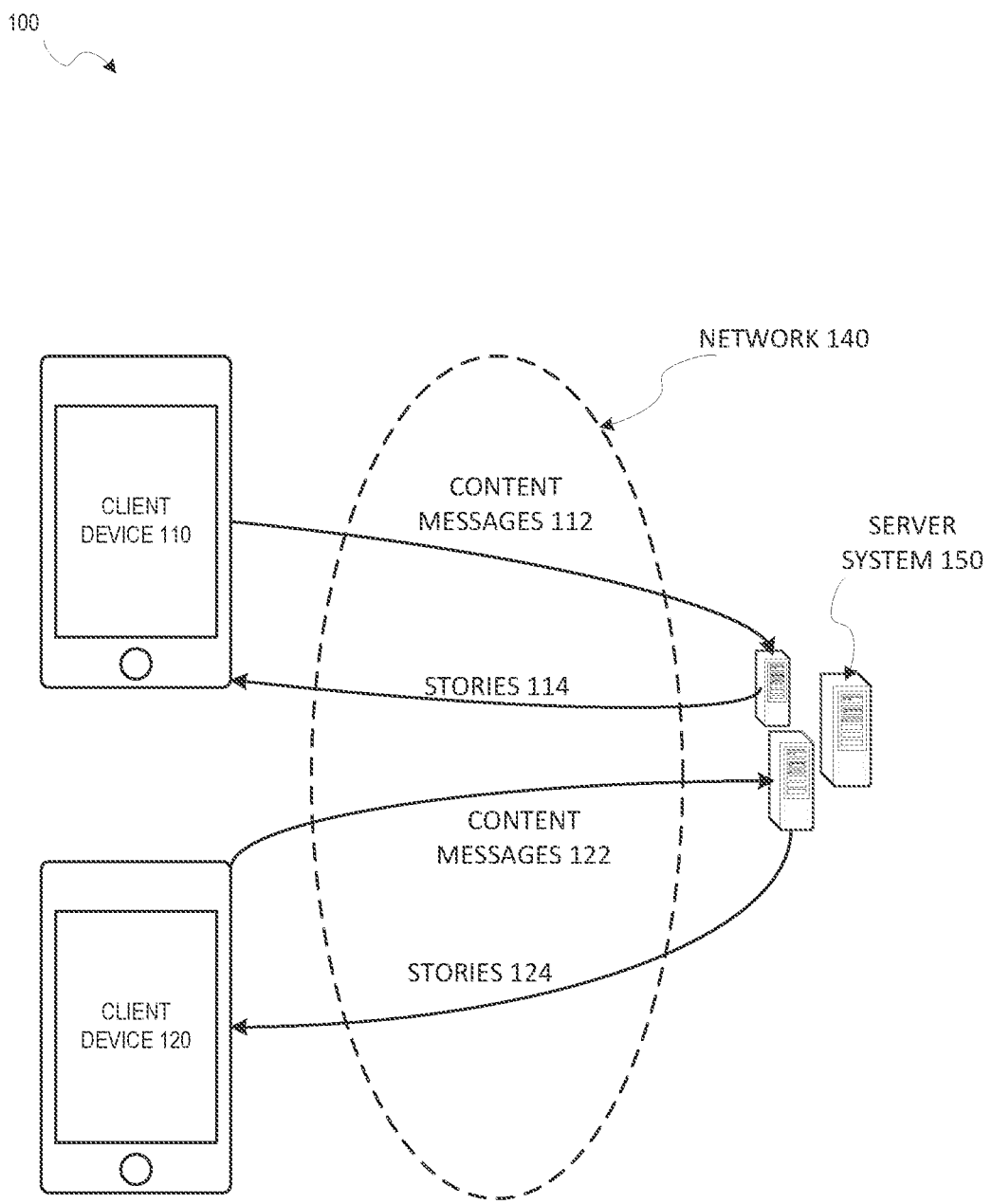
FIG. 1 is a block diagram illustrating a networked system, according to some example embodiments.

Systems and methods described herein relate to automated local story generation, curation, and presentation. Various embodiments described herein automatically generate stories from content received from different client devices such as smartphones. The stories are generated based on system trends and the characteristics of the received content. Story use trends may then be used to adjust how widely the story is available for viewing by system users.

"Content", as described herein, refers to one or more images, video clips, or multimedia clips captured by an electronic device, as well as any associated metadata descriptions. This includes metadata generated by an electronic device capturing an image or video, as well as metadata that may be associated later by other devices. A "piece of content" refers to an individual image or video clip captured by a client device. Content captured by such a client device may be sent individually via a network to other client devices as part of a social sharing network. A "content message" as referred to herein refers to the communication of content between one or more users via the system. Content may also be sent from a client device to a server system to be shared generally with other system users. Embodiments described herein relate to methods of grouping such public content from different sources into stories.

A "story" as described herein is a set of content. A story may be generated from pieces of content that are related in a variety of different ways, as is described in more detail throughout this document. For example, a "global" story is a story that is available to all of the users in a system. A "main" story is a story that is initially sent to an individual user based on a system's initial story generation process. A main story acts as an initial filter group of similar pieces of content that may be of interest to a user. A "sub-story" is a story that is sent to a user based on a selection of an image from a previous story. A sub-story includes pieces of content that share image characteristics with the selected image of the previous story.

An example system can operate by receiving pieces of content from smartphones or other client devices located all over the world. When content is received by the system, it is analyzed to determine location, time, and content details. Content details can be determined by machine vision analysis of content to identify objects and other details relating to the content. Image and video quality metrics can also be generated based on an automatic analysis. A set of content characteristics is then associated with the content based on the system analysis.

This example system then generates stories based on identified trends and the content characteristics for content in the system. The different stories are sent to different groups of client devices. Stories generated by a system may include a set of images and/or video clips selected based on: (1) whether the pieces of content were generated within a certain proximity of each other or within a local area (e.g. within a particular geofence); (2) how recent the content is; (3) image quality metrics; and (4) shared content characteristics (e.g. content characteristics identified by machine vision such as cats, automobiles, sports, or other such content). Stories generated by the system are then assigned to one or more user segments. Users may be assigned to one or more user segments in a variety of ways. Some user segments may be based on user location, while other user segments may be based on user interest, such as an interest in sporting events, music, weather, pets, or any other such user or system identified interest areas. In various embodiments, this user segment for a story may be adjusted over time based on system trends associated with the content characteristics used to generate a story (e.g. a spike in activity from a baseline or average for a location, content category, or other characteristic indicating a newsworthy event). Similarly, such trends may be used to generate new stories having content associated with a system trend. A device will then receive access to stories that are associated with the device's user segment (e.g. a device's location or an interest group associated with the device's account). In certain embodiments, this results in a user receiving stories focused on high-quality recent pieces of content that are generated close to a user. Stories that are older or generated from content taken further away from a user's current location may be provided to a user based on identified system trends. Various different metrics or different combinations of metrics may be used to select the stories available for presentation on a particular client device.

In some example embodiments, content is received by a system and processed using machine vision to identify content characteristics. Rather than stories being generated automatically, a story tool (e.g. computing device or software tool) may be used by a system operator to select content for inclusion in a story. The story may then be made available to an initial user segment. Based on system feedback as described herein, the system may then adjust which user segments may view the system operator generated story by automatically making the story available to a greater number of client devices if system feedback identifies trends associated with the story based on viewing, screenshotting, and other metrics.

When a user accesses a story on the user's client device, the user can view the content as part of the story and select an individual piece of content from a story. When a piece of content is selected from the story, this selection is communicated to the system. The system then provides the device with a sub-story based on the content characteristics of the selected piece of content. This process can continue with the user selecting another piece of content from the sub-story, with a resulting subsequent sub-story being sent to the user's client device. A provided user interface allows a user to navigate back to any earlier viewed story, and to continue viewing additional pieces of content from the earlier story. At any point another piece of content can be selected, resulting in an additional sub-story associated with characteristics of the newly selected content.

In certain embodiments, anonymous information about story viewing, selection of pieces of content within an individual story, and screenshotting of content on a client device is fed back to the system to influence the system trends that impact how stories are assigned to user segments. This feedback mechanism can also be integrated with the system trends associated with incoming pieces of content mentioned above to influence the selection of pieces of content for future story generation (e.g. when a story is generated or not generated). In certain embodiments, the system trends may be used to adjust assigned user segments for a story based on geographic tiers. In one such embodiment, a global tier is the top tier of the system, encompassing the entire world. Below the global tier is a country tier, with the country tier divided into a geographic area for each country participating in the system. Below the country tier is the state tier, then a city tier, then a local tier, etc. When a story is generated by such a system, it is automatically assigned to a user segment for a local geographic area associated with the location where the content was generated. In other words, the story is initially available only to devices within the area where the pieces of content were generated. Based on the system trends, a story can be assigned or "moved up" the tiers to a higher tier area, so that the story is visible beyond the local geographic area where the content for the story were generated. At the highest global tier, a story may be visible to all devices in a system, or may be visible to the broadest user segment possible for a particular story. As a system identifies increasing interest in a story, the story is pushed up to higher and higher geographic tiers. As the system identifies decreasing interest in the category, the story will similarly be pushed down to lower geographic tiers.

Certain embodiments of such a system may periodically assess newly received content to determine which pieces of content best represent certain system categories associated with a story. As new content messages associated with a story are received by the system, they may be added to a story, or used to update or replace some previously received pieces of content in a story.

In a system that operates with geographic tiers, the number and type of stories for different users in different geographic areas can have a different mix of stories presented for selection in a user interface of an application operating on a device. One set of stories made available to a first client device in a first local area could include all local stories. Another set of stories available in a different local area could include eight local stories, four city stories, one state story, no country stories, and two global stories. In certain embodiments this mix of geographic representation in the stories available on a single device change over time and for different user segments in different local areas based on the particular characteristics of the pieces of content available to a system. Other embodiments may not use fixed geographic tiers, but may assign an area to a story based on content characteristics or metadata associated with content in a story. For example, in certain embodiments a set of content for a story may all occur within a 10 meter radius, and the system may determine that the story will only be of interest to users that are very close to this location. Rather than making the story available to all users within a larger geographic area, the system may automatically assign an area to the story, and may make the story available only to users in the area that was generated and assigned for that story.

As a particular example of a system using geographic tiers, in one embodiment a sports arena may be assigned its own local geographic area or geofence. During a basketball game at the arena, users capturing content inside the arena have the option of sending content messages to the system for public use in stories. The system analyzes the pieces of content received and generates one or more stories for the system users inside the arena. The system may, for example, simply generate one story for the local geographic area that includes a mix of pictures and videos of the game and of fans attending the game.

If the game is particularly exciting the system may identify a trend. For example if the game is a playoff game that is tied with 10 seconds left, the system may see a spike in content messages sent from inside the arena for use in public stories. Based on this spike, a story from the arena is temporarily assigned a larger area (or higher tier), e.g., to state or national level visibility area, such that distant users within the new visibility area are provided access to the story from the arena. If interest in the game and the associated story remains high after the ending of the game, this story may remain at the higher tier, geographic visibility level based on viewing rates, screenshotting rates, or other system feedback received from client devices.

These metrics may be generated in different ways as a user navigates the system to view content within different stories. For example, if a user has access to the story from the arena, and the story includes a picture or video of a game-winning play from the arena, the user may select this content. The system then generates a sub-story for the user based on the characteristics of this content. For example, the generated sub-story may include pictures or videos showing gameplay highlights. If a user selects content from this sub-story showing a player dunking, a second sub-story may be generated and sent to this user showing pictures or videos of this player generally as well as other content showing dunks with other players. Selecting a piece of content from the second sub-story including the same player may result in a third sub-story that includes only content featuring the selected player. Selecting a second sub-story picture or video showing a different player dunking may result in an alternate third sub-story with content showing dunk highlights from the entire basketball season. Any screenshots of pictures or videos taken by the user, along with viewing time, percentage of pictures or video in a particular story viewed, or other such metrics can be sent to the system as feedback to establish baseline values for these metrics and to identify trends and influence a current user segment assignment for related stories as well as system operations for the generation of future stories.

FIG. 1 is a block diagram illustrating a networked system 100 according to some example embodiments. System 100 includes client device 110, client device 120, server system 150, and network 140 that is used to convey communications between client devices 110 and 120 and the server system 150. Client devices 110 and 120 may be any smartphone, tablet, phablet, laptop computer, network-enabled camera, or any other such network enabled device. Client devices 110, 120 may include a camera device for capturing content, or may be coupled to a separate camera device that is used to capture the content prior to sending to other client device 110, 120 for storage. Some embodiments may therefore include a wearable devices such as a pendant with an integrated camera that is coupled to a client device 110, 120. Other embodiments may include other associated devices with an integrated camera that may be wearable such as a watch, eyeglasses, clothing such as a hat or jacket with integrated electronics, a clip-on electronic device, or any other such devices that may communicate or be integrated with a client device 110, 120. Client devices 110 and 120 are connected to server system 150 via network 140. The network 140 may include any combination of wired and wireless connections. This may include cellular access networks, access point interfaces to the internet, or any other such networks 140 or network elements. For example, client device 110 may interface with network 140 using a Long Term Evolution (LTE) cellular network to communicate with server system 150, while client device 120 may use a Wi-Fi access point to interface with network 140 and communicate with server system 150. Server system 150 may be one or more computing devices as part of a service or network computing system. In certain embodiments, particularly embodiments with large numbers of client devices 110, 120 interfacing with a server system 150 from widely different locations all over the globe, server system 150 may be a distributed network 140 of server computers that are similarly widely distributed, and which communicate with each other via network 140. In some embodiments, client devices 110 and 120, as well as and any elements of server system 150 and network 140, may be implemented using elements of software architecture 702 or machine 900 described in FIGS. 7 and 9.

Networked system 100 then may be used in communication of content messages from client devices 110, 120 to a system 150, and communication of stories from the system 150 to the client devices 110, 120. As shown in FIG. 1, client device 110 communicates content message 112 to server system 150, and client device 110 receives stories 114 from server system 150. In addition to this functionality used for the embodiments described herein, client device 110 may additionally receive private pieces of content and communications from other users, and may convey a personal story to server system 150, with the personal story including images and or video from content messages 112 generated by client device 110 or another device coupled to client device 110. Similarly, client device 120 sends content messages 122 and receives stories 124, and may additionally perform other actions.

Figure 2A:
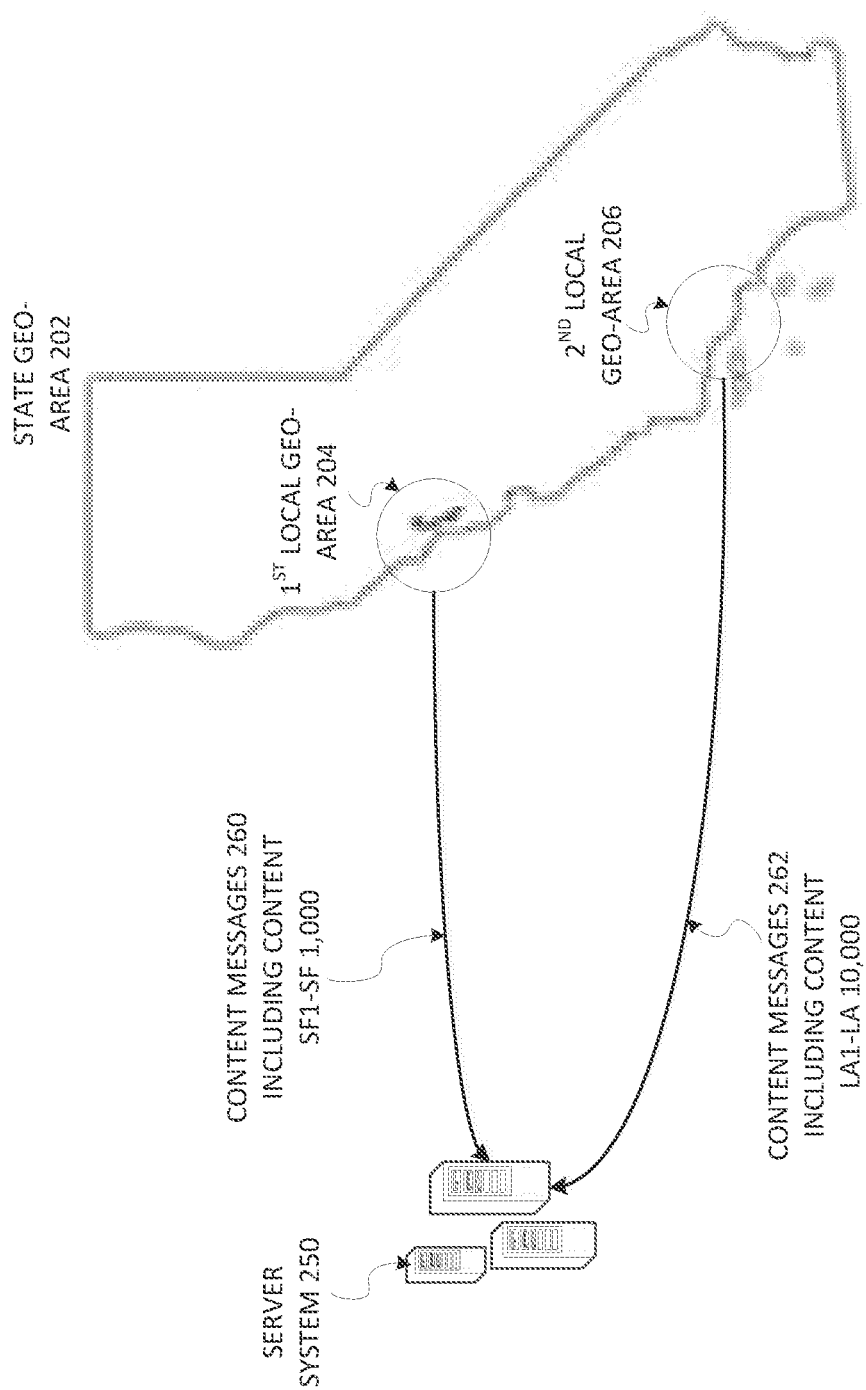
FIG. 2A illustrates aspects of server system operation receiving content for different geographic areas, in accordance with certain example embodiments.
Figure 2B:
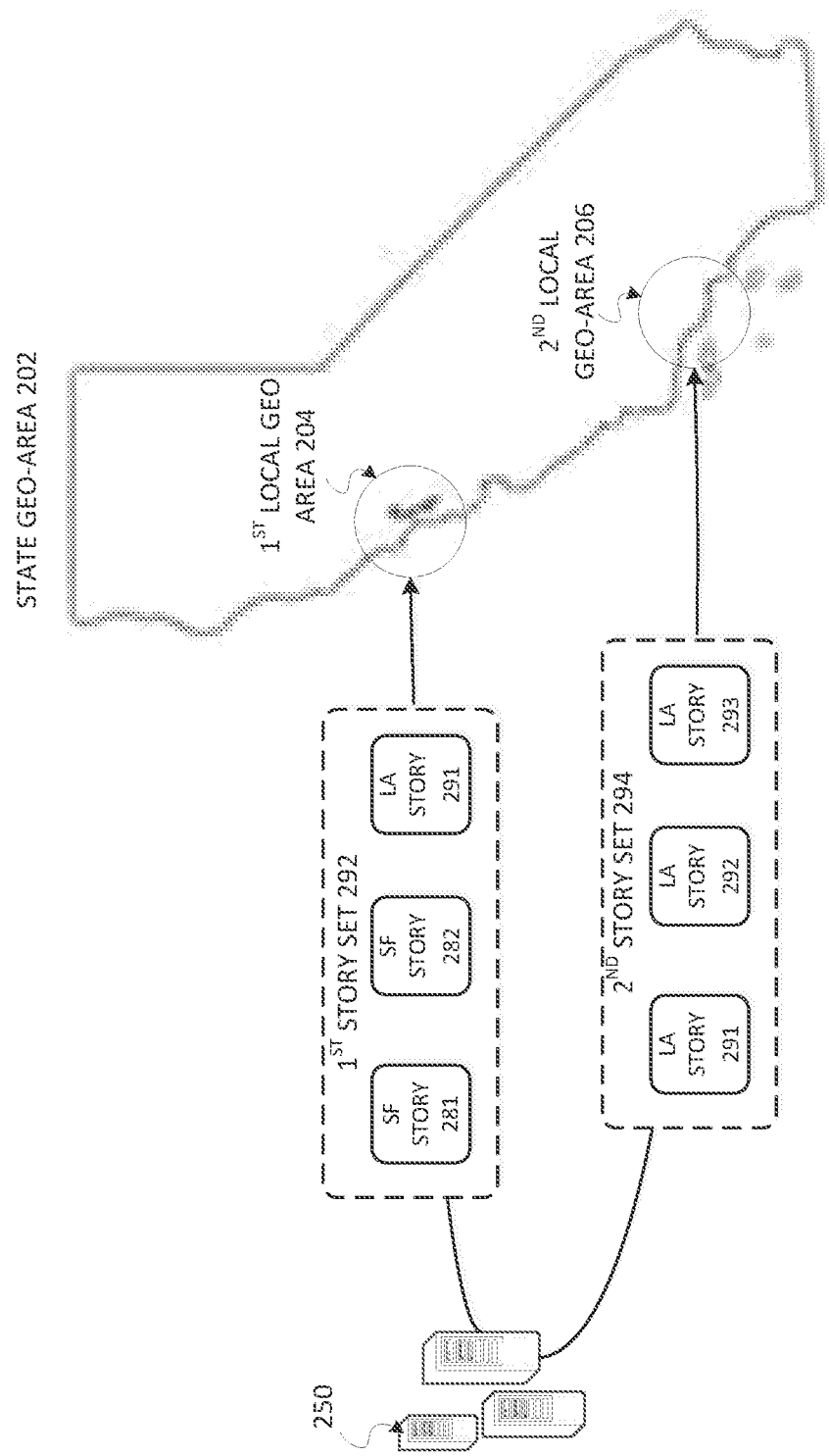
FIG. 2B illustrates aspects of server system operation sending different stories to different geographic areas, in accordance with certain example embodiments.
Figure 2C:
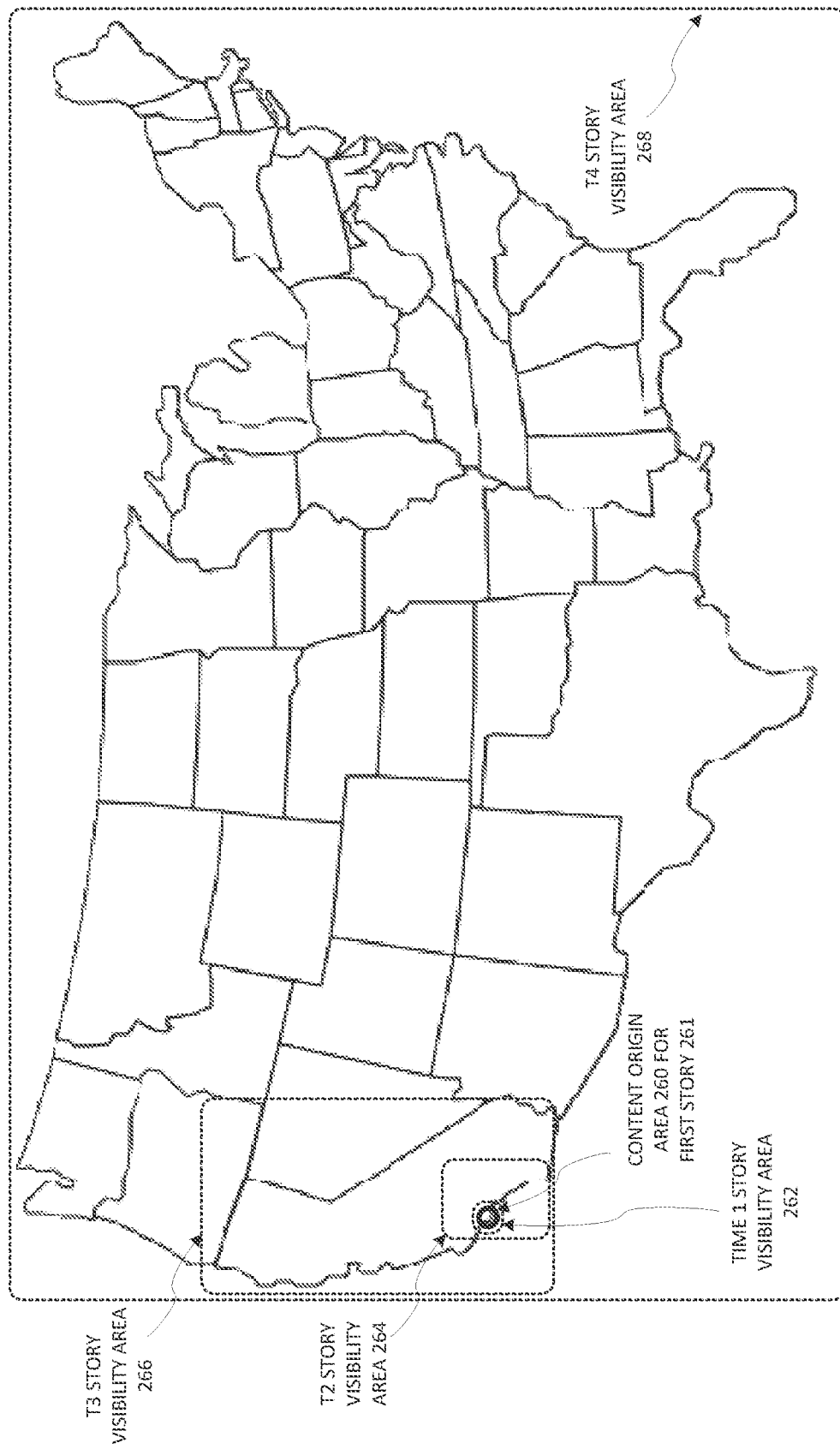
FIG. 2C illustrates aspects of content origin areas and associated story visibility areas according to some embodiments.
Figure 2D:
FIG. 2D illustrates aspects of content origin areas and associated story visibility areas according to some embodiments.

FIG. 2A illustrates aspects of server system 250 receiving content messages from different geographic areas in accordance with certain example embodiments. FIG. 2B illustrates aspects of server system 250 sending different stories to different geographic areas in accordance with certain example embodiments. FIGS. 2C and 2D illustrate how different stories may be assigned different visibility areas. In contrast to FIG. 1 that shows two client devices 110 and 120, FIGS. 2A-D show an abstract of the client side of a system where thousands or millions of client devices 110, 120 in different areas may be interacting with a server system 250.

Instead of individual client devices 110, 120, FIGS. 2A and 2B show a simple user segment representation with two local geographic areas 204 and 206, which are the lowest tier areas in this example. State geographic area 202 is one tier above local geographic areas 204 and 206, and state geographic area 202 encompasses these two local areas. This is a simplified representation for example purposes. Other embodiments may include many more tiers, and large numbers of adjacent lowest tier local geographic areas. As described above, one embodiment may include a local tier, a city tier, a regional tier, a state tier, a national tier, and a top level global tier. A lowest level local tier may be made up of local geographic areas of widely varying size and shape. A single local geographic area may be a public park, multiple city blocks, a university campus, a sports area, a shopping mall, a beach, a single building, or any such local area. In certain embodiments, geofences are used to define local areas. Such geofences may be tracked by aspects of a network system 100 including location systems within client devices such as client devices 110 and 120, network based location systems as part of network 140, separate location systems such as global positioning systems (GPS), or any combination of these or other location systems.

In other embodiments, rather than considering set geofences or groups of users, a system may generate stories for each client device individually. In such an embodiment, whenever a user navigates to a stories interface within an application operating on a client device, the client device communicates a current location to the server system 250. The location of the device or other device provided information at that time can be used to generate a list of stories for the device.

In the illustrated example of FIG. 2A, the client devices within first local geographic area 204 are grouped together and communicate 1000 content messages 260 to server system 250 in a first time period. The content associated with these content messages is shown as SF1 through SF1000. During the same time period, 10000 content messages 262 containing individual clips or images are sent to server system 250 by client devices within the second local geographic area 206, illustrated as content LA1 through LA10000. This volume of content is sufficient to overwhelm an individual user. Therefore, server system 250 operates as a curator to filter the content messages and provide a select set of the pictures and videos from the content messages as one or more stories.

In various embodiments, this curation function may be fulfilled by a server system 250 in different ways. At a high level, one example embodiment segments users by local area. Stories for a client device 110, 120 are generated from the most recent content messages that were generated in the client device's current local area. Such local content messages for a story can further be filtered based on image quality and image content. Image content may be used to prevent excess content duplication, to provide a variety of different content, to provide content identified as newsworthy (e.g. images associated with famous people), or based on any other such content filtering selections. Image content may also be analyzed to identify content duplication, and to avoid placing extremely similar content (e.g. videos of the same event from similar angles) in a single story. Additionally, the server system 250 can analyze trends associated with incoming content messages from other local areas to generate stories based on the trends identified by the system. Additional details related to server curation and story generation are discussed below with respect to FIG. 6.

FIG. 2B then illustrates a first story set 292 being made available to all client devices within the first local geographic area 204. Similarly, second story set 294 includes stories visible to all client devices within the second local geographic area 206. Second story set 294 is shown as including three stories, with all three stories generated from content messages originating in the second local geographic area 206. These stories of the second story set include LA stories 291-293. First story set 292 is shown as including two stories generated from content messages originating within local geographic area 204, SF story 281 and SF story 282. First story set 292 also includes a story generated from content messages originating within local geographic area 206, LA story 291. As described above, LA story 291 may be identified by server system 250 analyzing system trends, where a larger than normal number of story views, screenshots, incoming additional content messages, or other system trends identify LA story 291 as a story to be made visible to a larger user segment.

FIG. 2C illustrates an example embodiment of how another story can be generated by server system 250 and made available to different user segments over time. As illustrated by FIG. 2C, content messages are received from content origin area 260 and are used to generate first story 261. At an initial time T1 when story 261 is first made available to system devices, the story is only visible to devices within T1 story visibility area 262, which is essentially the same area as the content origin area 260 where the content messages originated. Over time, the server system 250 identifies feedback baseline values that are used to establish system trends that deviate from baseline values and thus indicate interest in certain content. The server system 250 continuously expands the visibility area associated with the first story 261 based on such trends. At a second time T2, the story is visible in a regional area, shown as T2 story visibility area 264. At time T3, the first story 261 is visible at a state level, shown as T3 story visibility area 266. At time T4, the story 261 is visible to all devices at a country level, shown as T4 story visibility area 268. For example, such a story expansion over time may occur if a music festival with popular bands is taking place in content origin area 260, with a spike in content messages from that area occurring during the festival. Analysis by server system 250 identifies the spike in content messages, and automatically generates a story with pictures and video identified by machine vision as being content from the festival. The story is initially only visible in the local area, but is frequently viewed and screenshotted, and so is promoted to a regional/city story. The festival story is similarly popular as a regional story, and is promoted again to be a state story, and then promoted again to be a national story, so that anyone in the United States is able to view the story. After a certain amount of time, the story may be removed from the system and replaced with other stories. In some embodiments, this may occur with system trends determining that the story is less popular, and moving the story back down through the tiers until it is back to being a local story. In other embodiments, the story may simply be removed from the system after a certain period of time has passed.

By contrast, FIG. 2D illustrates aspects of an embodiment for stories where the user segment does not change over time. FIG. 2D shows that the content origin area 260 is also the local area where content messages originate for a second story 271. System baseline values and trends determine, however, that an insufficient level of interest is generated and thus the second story 271 is not promoted to a larger area. As a result, for times T1 through T4, the visibility area for second story 271 remains the same area. For example, if a water main breaks, resulting in a sudden spike of content messages from a flooded area near the break, the system may analyze the spike of related incoming content messages and automatically generate a story associated with the water main break. If the story does not generate sufficient interest to be promoted, the visibility area will remain the local area around where the content is captured, and only local viewers will have access to view the second story 271. This story will then eventually be replaced by other stories, and will be removed from the system.

Third story 275 accepts content from the entire national area as content origin area 274 and maintains this national area as T1-T4 third story visibility area 276. For example, on a national holiday such as the 4th of July in the United States, all content messages received in content origin area 274 may be processed using machine vision to identify fireworks images or other holiday images. Such a story may be triggered by a calendar event or a system setting matched to the holiday, or such a story may be generated in response to the system identifying a trend or a set of content messages meeting certain thresholds for generation of a national story. These content messages may automatically be used to generate third story 275, and third story 277 is visible from the entire national area during the holiday.

As mentioned above, the stories available to a device vary over time, and different sets of stories are available to different devices. In the example embodiment of FIGS. 2C and 2D, at time T1, devices outside T1 story visibility area 262 are able to view third story 277, but not first story 261 or second story 271, while devices inside area 262 are able to view all three of these stories. This changes over time, and at time T4, all users can view first story 261 and third story 271, but only users within area 262 are still able to view all three of these stories. Additionally, other stories may be provided to different devices, such that some additional stories may be available to users in other local geographies that are not available in T1 story visibility area 262. Similarly, story sets 292 and 294 are each illustrated as including three stories. In various embodiments, the story set available to a device at a particular time may include any number of stories. In certain embodiments, a maximum number of stories may be enforced by a server system 250, while in other embodiments, any number of stories meeting system thresholds for story generation and presentation may be offered to a user at any given time.

Figure 3A:
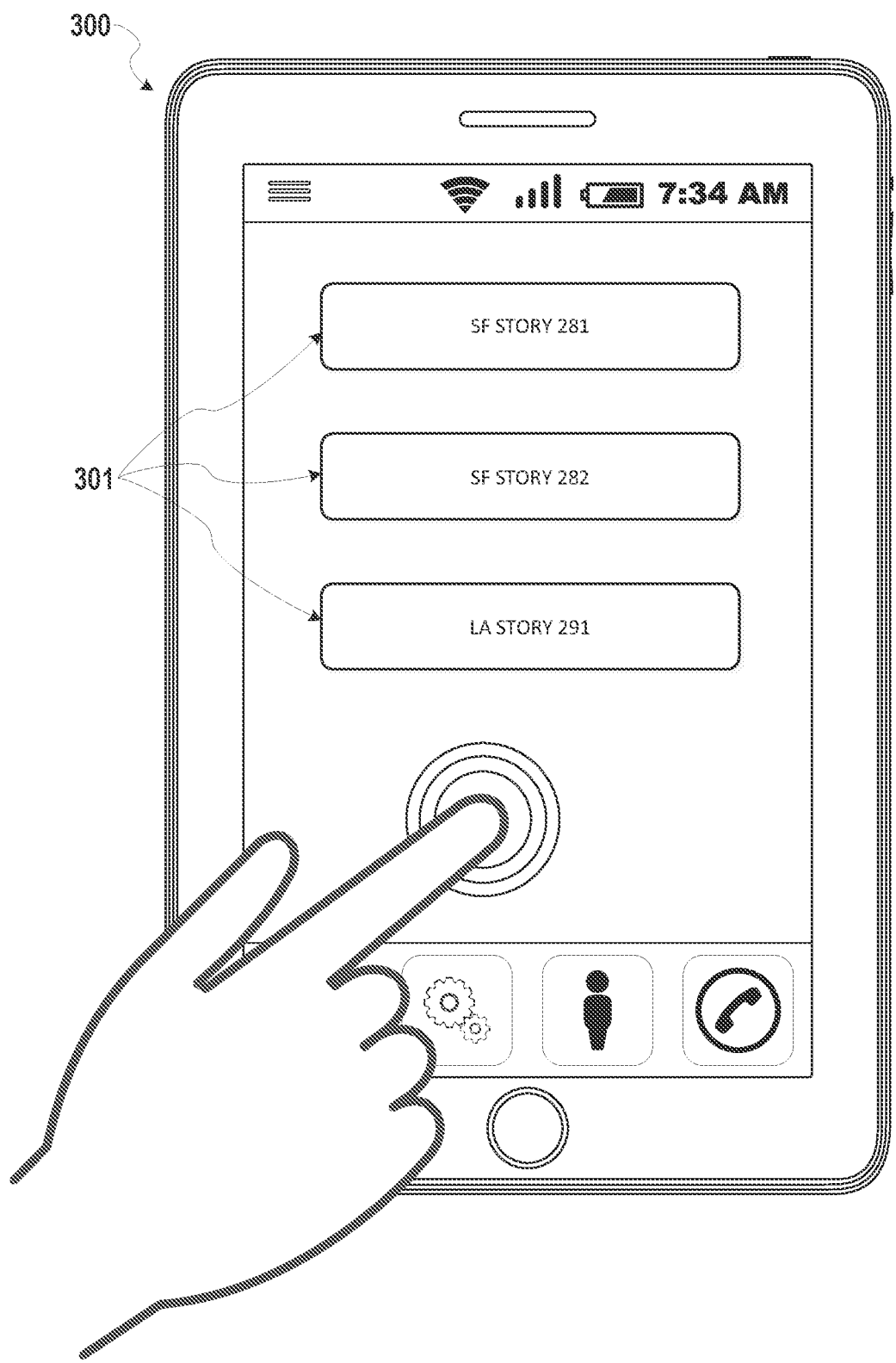
FIG. 3A illustrates aspects of story generation, according to some example embodiments.

FIG. 3A illustrates an embodiment of a user interface for a client device 300. Client device 300 shows user selectable interface areas 301 for each story in first story set 292, including SF story 281, SF story 282, and LA story 291. Additional stories interface areas may be provided by scrolling up and down. Each interface area may provide basic details or sample images associated with each story. In certain embodiments a story or part of a story may be provided to client device 300 prior to a selection of an interface area 301. In other embodiments, images of a story are communicated from a server system such as server system 250 following selection of a particular interface area 301.

Figure 3B:
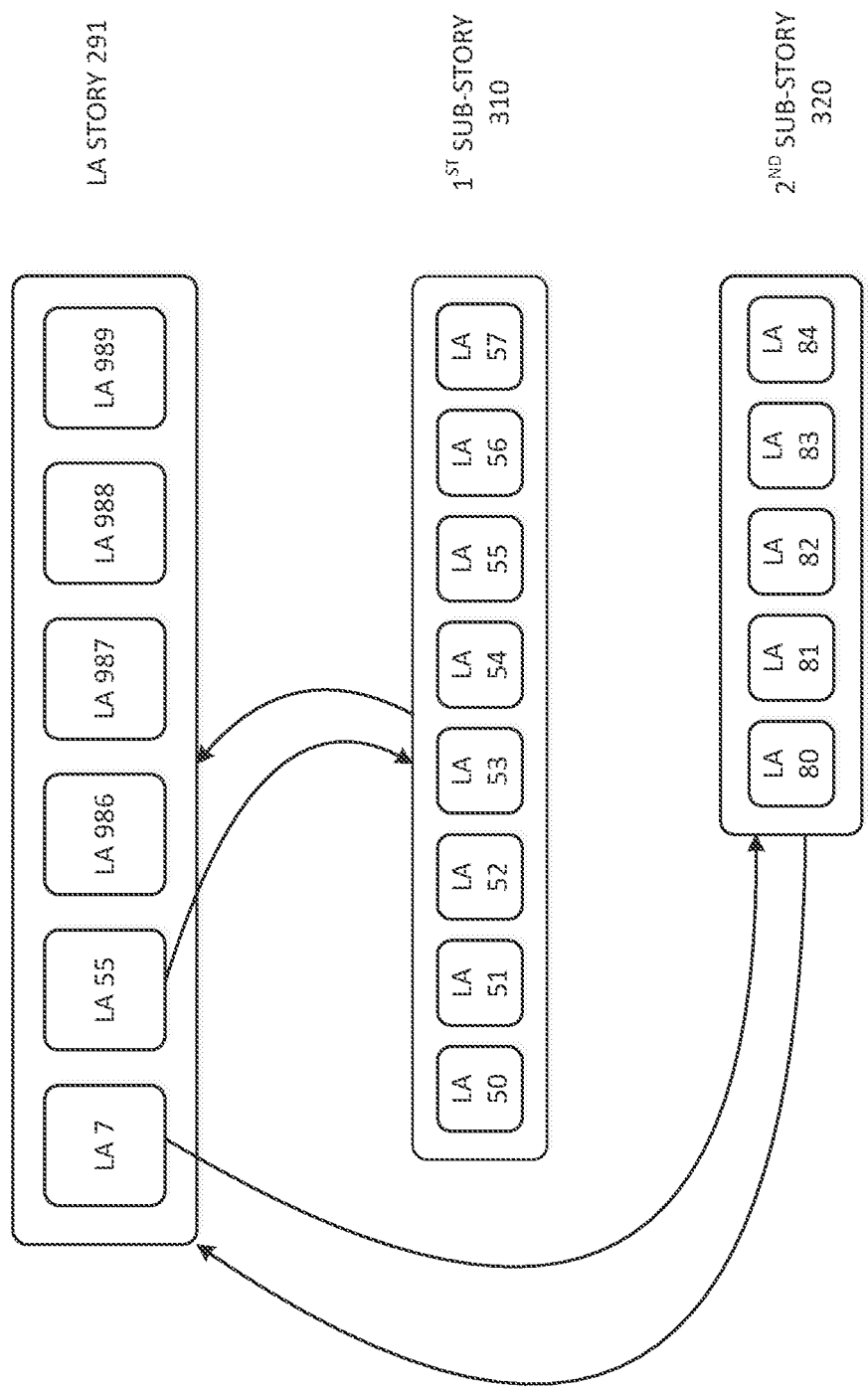
FIG. 3B illustrates aspects of story generation, according to some example embodiments.
Figure 3C:
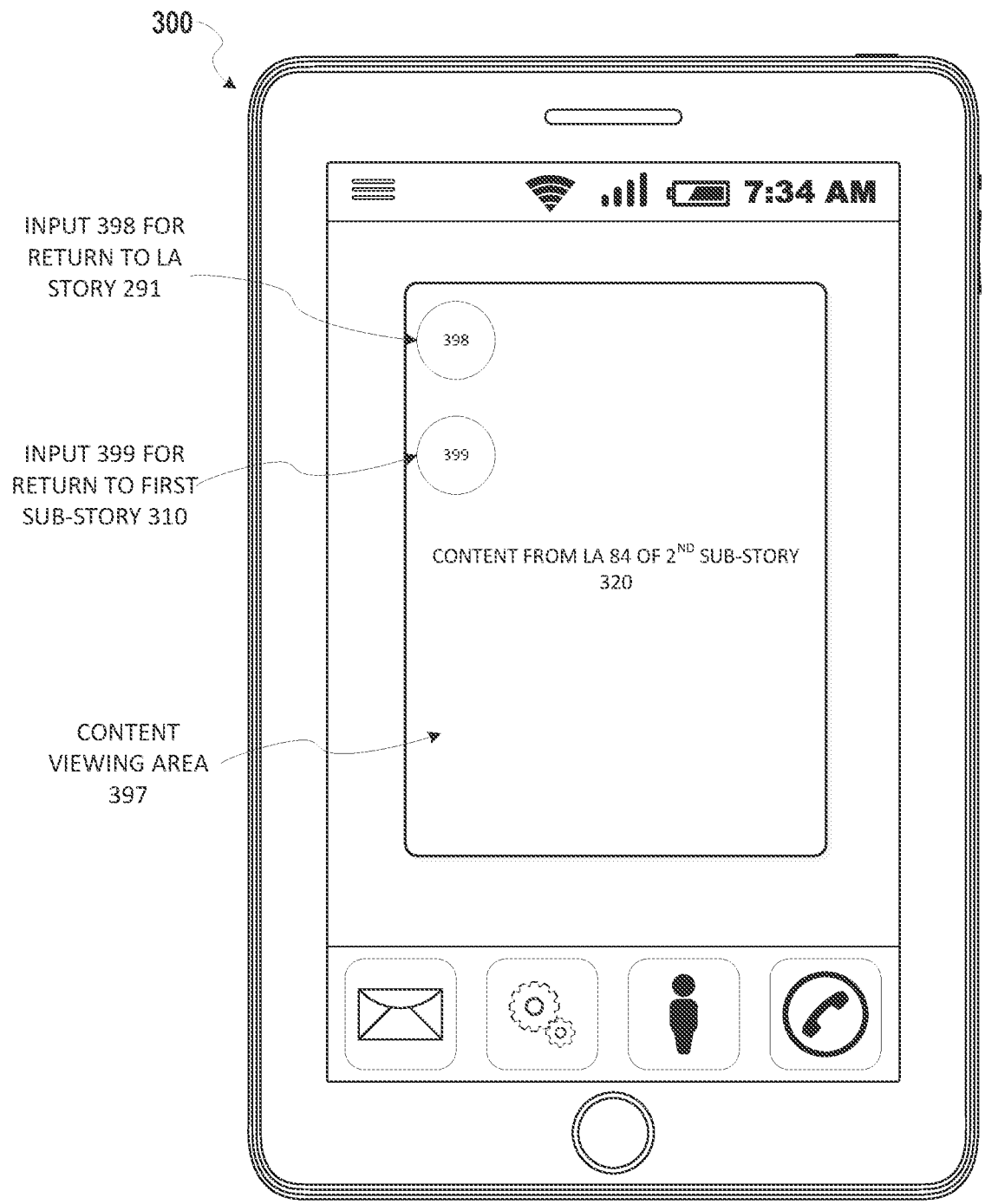
FIG. 3C illustrates aspects of story generation, according to some example embodiments.

FIG. 3C illustrates one embodiment of an interface for viewing stories and sub-stories such as the stories shown in FIG. 3B. In FIG. 3C, when a story or sub-story is received for viewing on device 300, an individual piece of content is displayed within content viewing area 397. In the embodiment of FIG. 3C, a user has navigated to content LA 84 (either image or video) of second sub-story 320. Input areas are visible for a return to previously navigated stories. As shown, input 398 is available to switch to LA story 291, and input 399 is available to switch to first sub-story 310. If either input 398 or 399 is selected, the first picture or video of the selected story will be displayed within content viewing area 397. The viewer may then view some or all of the pieces of content within a story, and may either navigate to a new sub-story by selecting the picture or video displayed in content viewing area 397, or may return to a previous story. In further embodiments, a user may navigate between various stories and sub-stories using other user interface inputs. For example, a user in a sub-story may swipe up on content displayed on a device to return to a previously viewed story in some embodiments. Similarly, if a user has previously navigated back to a previously viewed story by swiping up, some embodiments may enable a swipe down user input to navigate to a sub-story. Other embodiments may use drop-down menus or menu lists of recently viewed stories that are accessed by a physical button on a client device to enable navigation between multiple different stories and sub-stories.

FIG. 3B then illustrates aspects of story generation according to some example embodiments. After a story is selected by a user interface action with an interface area 301, a story is displayed on client device 300. A user may then view various stories and sub stories. FIG. 3B shows LA story 291, which may be selected from the interface area 301 of FIG. 3A. Following such a selection, pieces of content from LA story 291 may be viewed. As illustrated, LA story 291 includes images or videos from content messages including content LA 7, LA 55, and LA 986-989. As an image from content LA 55 is displayed on a screen of device 300, the user may select the image from content LA 55. This selection is communicated from client device 300 to a server system, and the server system responds with first sub-story 310. First sub-story 310 includes videos or images from content LA 50-LA 57 having characteristics similar to one or more characteristics of content LA 55. After viewing some or all images of first sub-story 310 in an interface similar to the interface shown in FIG. 3c, the user may navigate back to LA story 291. When viewing video LA7, the user may then select image LA 7, and second sub-story 320 will be received from the server system in response to the selection of image LA 7. The user may then view some or all videos or images from content messages LA 80 through LA 84 of second sub-story 320 before navigating back to viewing the content of LA story 291.

For example, if LA story 291 includes videos of flooding and image LA 55 shows flood water in a local geographic area, a communication of this selection is sent to server system 250. Server system 250 then responds with a first sub-story 310 having content that share content characteristics with the selected image LA 55. In this case, all content associated with content messages LA 50 through LA 57 may include pictures or videos showing a specific area from different angles, as well as older pictures or videos of the specific area before the flooding occurred.

The user may then return to the original story to continue viewing content in LA story 291, and may select an additional image or video within LA story 291. If the user then selects a video from content message LA 7 of a dog walking through the flood water of the event that initiated the creation of LA story 291, then this selection is communicated to server system 250, and the server system 250 responds with second sub-story 320. Based on the video of the dog and the flood water images from content messages, LA80-LA84 may include images or videos of dogs. This process can be recursive, such that a user can then select an image or video within a sub-story, and receive an additional sub-story. For example, if a user selects an image or video from content communication LA80 showing a particular type of dog, then another sub-story may be received including content including that type of dog from different times or from other areas. If a user selects a piece of content from content communication LA84 showing a video of dogs playing around flood water, then another sub-story may be generated showing only dog content with dogs playing around water. Additional details related to selection of content for sub-stories are discussed below with respect to FIG. 6.

Figure 4:
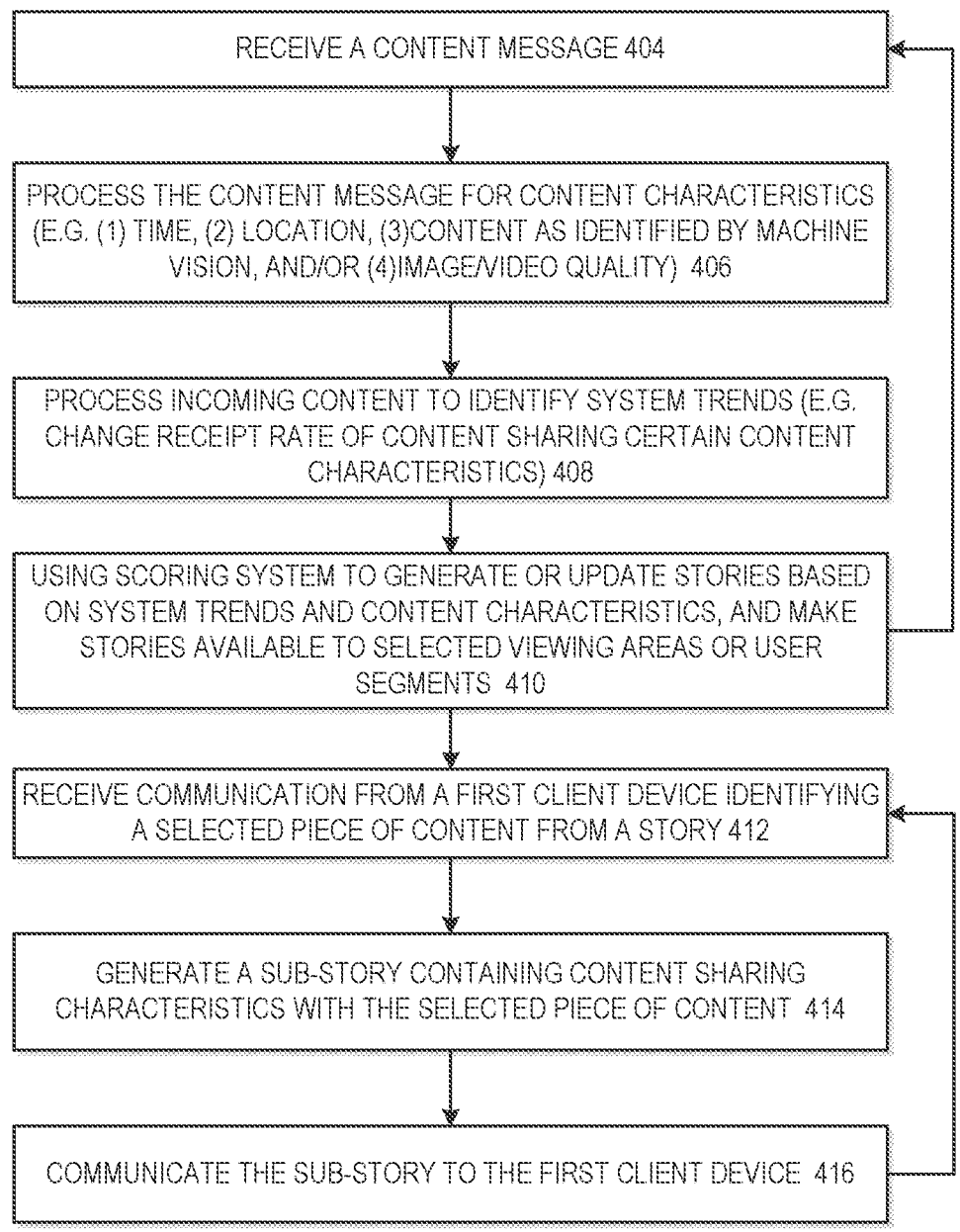
FIG. 4 is a flowchart illustrating aspects of a method, according to some example embodiments.

FIG. 4 is a flowchart illustrating aspects of a method 400, according to some example embodiments. For illustrative purposes, method 400 is described with respect to networked system 100 of FIG. 1. It is to be understood that method 400 may be practiced with other system configurations in other embodiments.

In operation 404, a server system 150 receives content messages 112, 122 from a client device 110, 120 via network 140. In operation 406, the content received in operation 404 is processed to identify content characteristics. This operation 406 may identify a time at which the content was generated, a location where it was generated, or other associated time and location information. If more than one piece of content (e.g. multiple video clips or pictures) are received, then a time period may be identified. Server system 150 may also include a machine vision module which is configured to identify objects within the content. In certain embodiments, a machine vision module may include a dictionary of objects and object arrangements. Based on the objects and/or object arrangements identified by the machine vision module, one or more values may then be assigned as content values as part of a set of characteristics associated with the piece of content by the processing of operation 406. Additionally, image or video quality values may be assigned to content. Such values may include blurriness values, brightness values, color profile values, contrast values, or any other such quality values. In embodiments where content include video clips having different frame rates or other characteristics unique to video clips, this information may also be used to assign quality values as part of a set of content characteristics.

In operation 408, the content received in operation 404 is processed with other incoming pieces of content to identify system trends. For example, a server system 150 may keep a record of image content values assigned by system processing, and how frequently (e.g. a content receipt rate) content with a particular content value is received. Such frequency and receipt rate metrics may be maintained anonymously by server system 150 for any content characteristic values, and used to establish expected baseline values that are associated with normal system activity for particular dates, times, events, or other periods that may be identified within a system. When the server system 150 identifies a spike (e.g. a variation from the expected baseline) in a receipt rate of content associated with a particular content characteristic value, this can be identified by the server system 150 as a system trend. Selection of particular pieces of content as part of story viewing may also be tracked by a system. When the server system 150 receives user selections associated with a piece of content and sends an associated sub-story to a client device, this may be tracked to determine system trends. If a particular piece of content is selected frequently, this information may be used as system feedback for selecting the piece of content for future stories, or for including it in stories for a larger geographic area. In various embodiments, an application operating on a client device may also gather information about how a user interacts with certain pieces of content or stories. For example, the application may record how frequently or for how long a particular story or piece of content within a story is viewed. The application may also track how many images or videos within a story are viewed prior to the user navigating away from a story. This information may be collected and sent to server system 150 for use in determining trends. For all of the above, in different embodiments, server 150 may use different statistical analyses with associated thresholds or criteria to trigger the identification of a system trend.

In operation 410, the system trends identified in operation 408 and the individual content characteristics for the piece of content identified in operation 406 are used to determine if a story should be generated or updated.

If a story is being generated for the first time, a user segment or visibility area is assigned to the story. This may involve an identification at server system 150 of user segments with shared characteristics to be used for story segmentation. This may simply involve assigning a story as visible within a geofence where content from the story originated. Grouping users reduces processing loads on server system 150 by reducing processing resources needed to determine which stories are available to which devices. In other embodiments, stories may be generated on a per client device basis, without such user segments. In such embodiments, stories may be considered individually curated for single client devices 110, 120. One example embodiment of a user segment is a user segment based on area tiers as described above. In other embodiments, user segments may be based on system supported interest groups. For example, the system may allow a user to indicate an interest in sports. In such an example, basketball, football, soccer, baseball, hockey may correspond to the higher level tiers, with different leagues and/or levels corresponding to lower level tiers. When stories containing content related to basketball are generated, a user's device may be provided access to that story regardless of where the user's device is located. In some embodiments, this interest indication may be used as system trend data to trigger the system to generate more stories related to basketball.

If a story is being updated, then feedback information received at server system 150 is analyzed to determine if a story should be more widely available or less widely available based on system metrics for story visibility.

In some embodiments, a user provides one or more system settings to identify categories that a user is interested in. These categories are then used by the system to identify user segments, which are groups of users that have expressed interest in shared categories or are otherwise grouped together by the system. The system can independently generate story sets for a user's devices based on category selections. In other embodiments, content viewing characteristics associated with a client device or a user account may be used to generate or update interest profiles. This information may be used not only to generate story sets for the user and other users with similar profiles, but this information may also be used as system feedback for determining trends in the system. Other embodiments may particularly exclude the use of individual device or account profiles for privacy purposes, and may only use data received from client devices that is stored anonymously.

Additionally, in some embodiments as new content is received that is associated with categories that were used to generate a story, then the pieces of content for a story may be adjusted. In certain embodiments, new content is appended to the end of a story. In other embodiments, content may be both added and removed from a story based on threshold values for inclusion in a particular story. When a story is generated or updated as part of operation 410, the new story is made available to individual client devices 110, 120. In some embodiments, the communication of the story to a particular client device 110, 120 may occur automatically as part of a push from server system 150 to the client device 110, 120. In other embodiments, a client device 110, 120 generates a request for a story as part of application operations at the client device 110, 120. For example a user navigating to a story interface within an application may automatically generate a request from the client device 110, 120 to server system 150 for the main story associated with the client device's 110, 120 user segment.

Operations 404 through 410 will repeat during system operation. In certain embodiments, a server system 150 may aggregate content over a set period of time, or may aggregate a set number of pieces of content before processing the content and updating a story or generating a new story. In other embodiments, updates and new stories for a user segment may occur only when a client device 110, 120 associated with a user segment requests a list of available stories. In further embodiments, criteria associated with incoming content may be used to trigger an update or new story generation. For example, during periods when large numbers of content messages are received that are related with categories or events identified as trending, a new story or a story update may be triggered. In other embodiments, various combinations of these update periods and triggers may be used, along with any other possible criteria for initiating an update to a story.

As these operations above repeat to generate new stories and update existing stories, a client device 110, 120 may periodically send a communication to server system 150 identifying a user selection of a picture or video with a story, as illustrated by operation 412. After receipt of such communication in operation 412, in operation 414 a sub-story is identified by the server system 150, with the sub-story containing content sharing content characteristics with the selected picture or video. This sub-story may be generated as the request is received, or may be generated by the system as the piece of content is initially placed in a story. The sub-story is then communicated to the client device 110, 120 that sent the communication. This process of operations 412 through 416 may similarly repeat with the client device 110, 120 selecting different pieces of content or navigating to previously received stories, and the server system 150 communicating the associated stories and content to the client device 110, 120.

Figure 5:
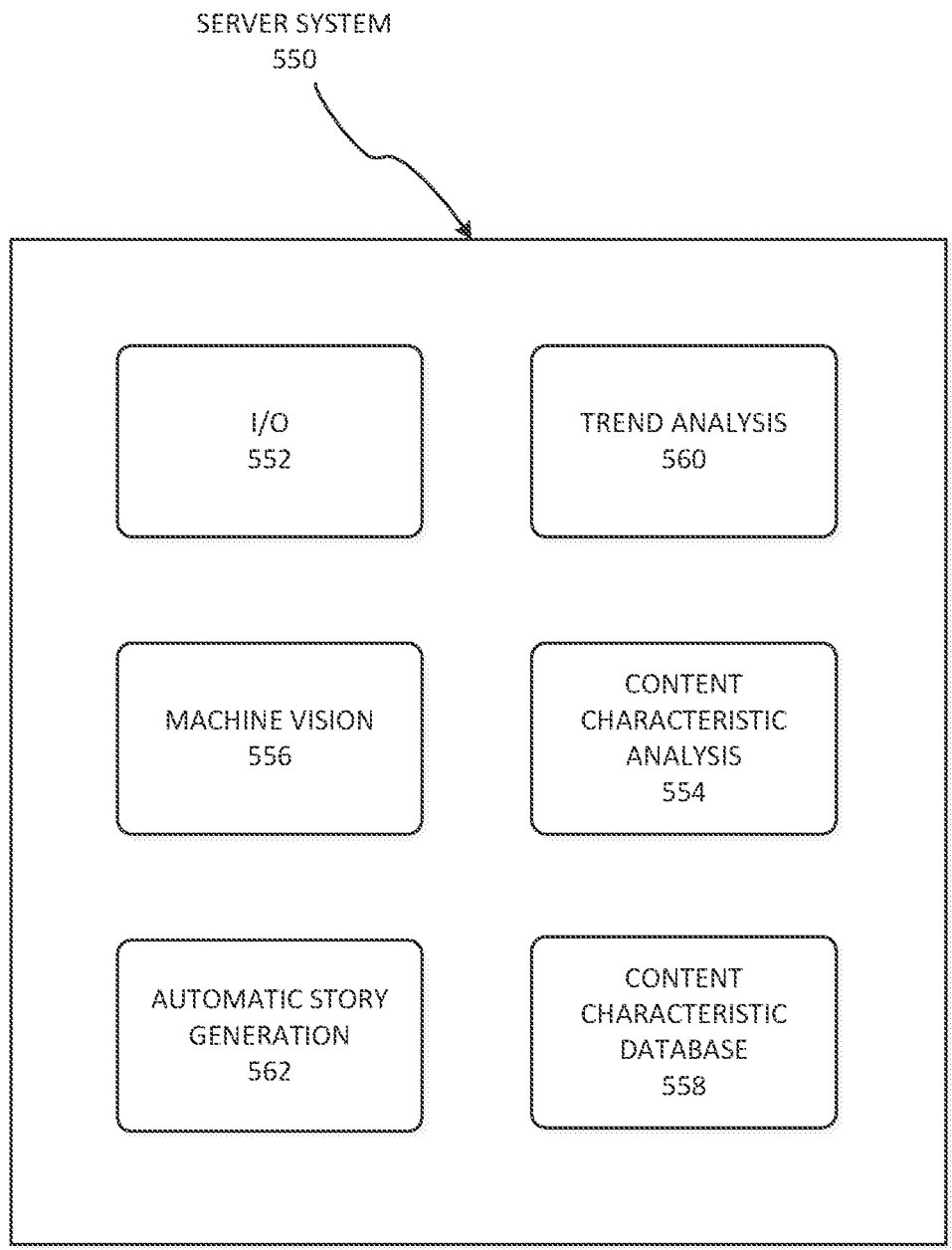
FIG. 5 illustrates aspects of a server system for automated local story generation and curation, according to some example embodiments.

FIG. 5 illustrates aspects of a server system 550 for automated local story generation and curation, according to some example embodiments. In various embodiments, server system 550 may be used as an implementation of server system 150 or server system 250. The example server system 550 includes input and output (I/O) module 552, content characteristic analysis module 554, machine vision module 556, content characteristic database 558, trend analysis module 560, and story generation module 562.

I/O module 552 may include any hardware, firmware, or software elements needed to send and receive content and stories to client devices 110, 120 via a network 140. Content characteristic analysis module 554 may include devices, processors, and software to analyze images from pictures and frames of video clips, and then determine content characteristics, including details about when and where a picture or video was generated. In certain embodiments, content characteristic analysis module 554 may be implemented as a plurality of different modules, each analyzing a different content characteristic, including any content characteristic described herein.

Machine vision module 556 describes a particular module that may be used to identify content characteristics based on the content of an image or images in a video. Machine vision module 556 includes hardware, firmware, and/or software for analyzing and understanding content. In one embodiment, machine vision module 556 is associated with a dictionary comprising image and video content values. Objects identified in images of a piece of content and the arrangement of the identified objects therein may be used by machine vision module 556, in such an embodiment, to select one or more content values from the dictionary as content characteristics. For example, a simple such machine vision module 556 may identify a ball in an image, and select the values ball and game as content characteristics. A more complex module may identify the type of ball as a basketball, and include "basketball" as a characteristic value. A still more complex machine vision module 556 may identify a basketball, a crowd, a court color, and an elevated perspective of the court to identify "professional basketball game" and "basketball arena" as content values for the content. The same complex machine vision module 556 may identify a basketball, a park background, and a concrete court surface and associate "amateur basketball game" and "playground basketball" as content values for the content.

These content values generated by machine vision module 556 can then be stored in content characteristic database 558 along with other characteristic values. Such characteristic values can include: one or more content values (i.e., an identification of what's in the content); a generation time; a generation time period; a generation location; a generation area; one or more quality values, any metadata value associated with content, an identifier for a particular piece of content, or any other such values. In some embodiments, a copy of content may be stored in content characteristic database 558 with location information, capture time information, and any other such information about a piece of content. In certain embodiments, content characteristic database 558 may anonymously store details about content use. For example, client devices 110, 120 can communicate details about presentation of the content on a screen of the device, and about screenshots taken of the content. Anonymous metrics about how often a piece of content is viewed as part of a story, how long the content is viewed for, and how frequently screenshots are taken may then be measured by server system 550, as part of analysis by content characteristic analysis module 554, with the resulting data stored in content characteristic database 558.

Trend analysis module 560 may then use details from content characteristic database 558 to identify patterns associated with content characteristics. Trend analysis module 560 may track how frequently machine vision module 556 associates content with the content value "basketball." Trend analysis module 560 can also track content characteristics associated with location, times of day, times of year, holidays, and other such characteristics in addition to content characteristics. Further, multiple characteristics may be tracked together to identify complex patterns.

Story generation module 562 may then use information about pieces of content from content characteristic database 558 as well as information about trends from trend analysis module 560 to select particular pictures or videos for an automatically generated story. In various embodiments, story generation module 562 may use complex scoring, weighting, and other rules in generating a story. For example, certain embodiments may require that all pieces of content meet a quality threshold unless a trend having certain threshold characteristics is identified and all content associated with the trend are below the quality threshold. Another embodiment may weight story generation based on a number of stories currently available in a local geographic area. In still further embodiments, any number of complex rules may be applied together as part of story generation to filter images and videos for a story based on time, location, content, and quality.

Similarly, when a user selects a piece of content in a story, if a single input is provided, the system may select content for a sub-story using similar rules. For example, if a selected piece of content is associated with six different content characteristics, the system may attempt to provide images or videos for the sub-story having a variety of each of the six different content characteristics. Selection of a piece of content in the sub-story that shares two of the original six characteristics may then result in a second story that includes content having those two shared characteristics. Certain embodiments may allow content in sub-stories to be older or further away from a requesting client device 110, 120, while other systems may maintain strict limits on how far away and how recently pieces of content were generated. In certain embodiments, content selection may provide a user interface listing content characteristics, and a user may select which content characteristics are to be used to generate a sub-story.

Figure 6:
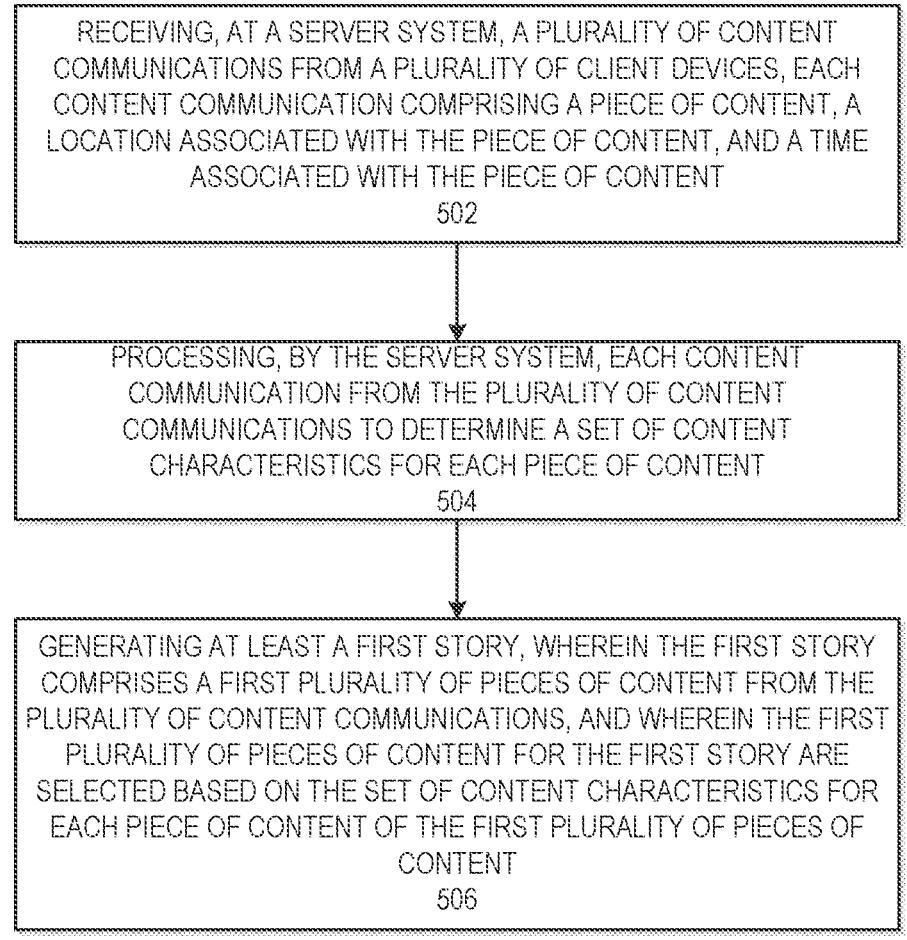
FIG. 6 is a flowchart illustrating aspects of a method, according to some example embodiments.

FIG. 6 is a flowchart illustrating aspects of a method 600, according to some example embodiments. Method 600 is a method performed by a server system 550. For the purposes of illustration, method 600 is described with respect to server system 550. In other embodiments, method 600 may be performed by various other server system implementations.

Method 600 begins with operation 602 receiving, at an I/O module 552 of server system 550, a plurality of communications from a plurality of client devices 110, 120. Each communication includes a piece of content, a location associated with the content, and a time associated with the content.

Operation 604 then involves processing, by the content characteristic analysis module 554 of the server system 550, each content communication from the plurality of communications to determine a set of content characteristics for each piece of content.

Operation 606 then involves generating, using a story generation module 562 of server system 550, at least a first story set 292, where the first story set 292 includes a first plurality of content from the plurality of communications, and where the first plurality of content for the first story set 292 are selected based on the set of content characteristics for each piece of content of the first plurality of content. In certain embodiments, content characteristics are additionally identified using machine vision module 556 to identify content values. Additional embodiments of method 600 may also involve performing a trend analysis associated with one or more content characteristic values using trend analysis module 560, and a story may be generated based on trend analysis and content characteristics.

While method 400 and method 600 each present a set of operations in a particular order, each of these methods may be implemented with operations in different orders, or with additional operations included between the described operations. Other methods, including a variety of other system implementations and operations, are also possible in other embodiments.

Figure 7:
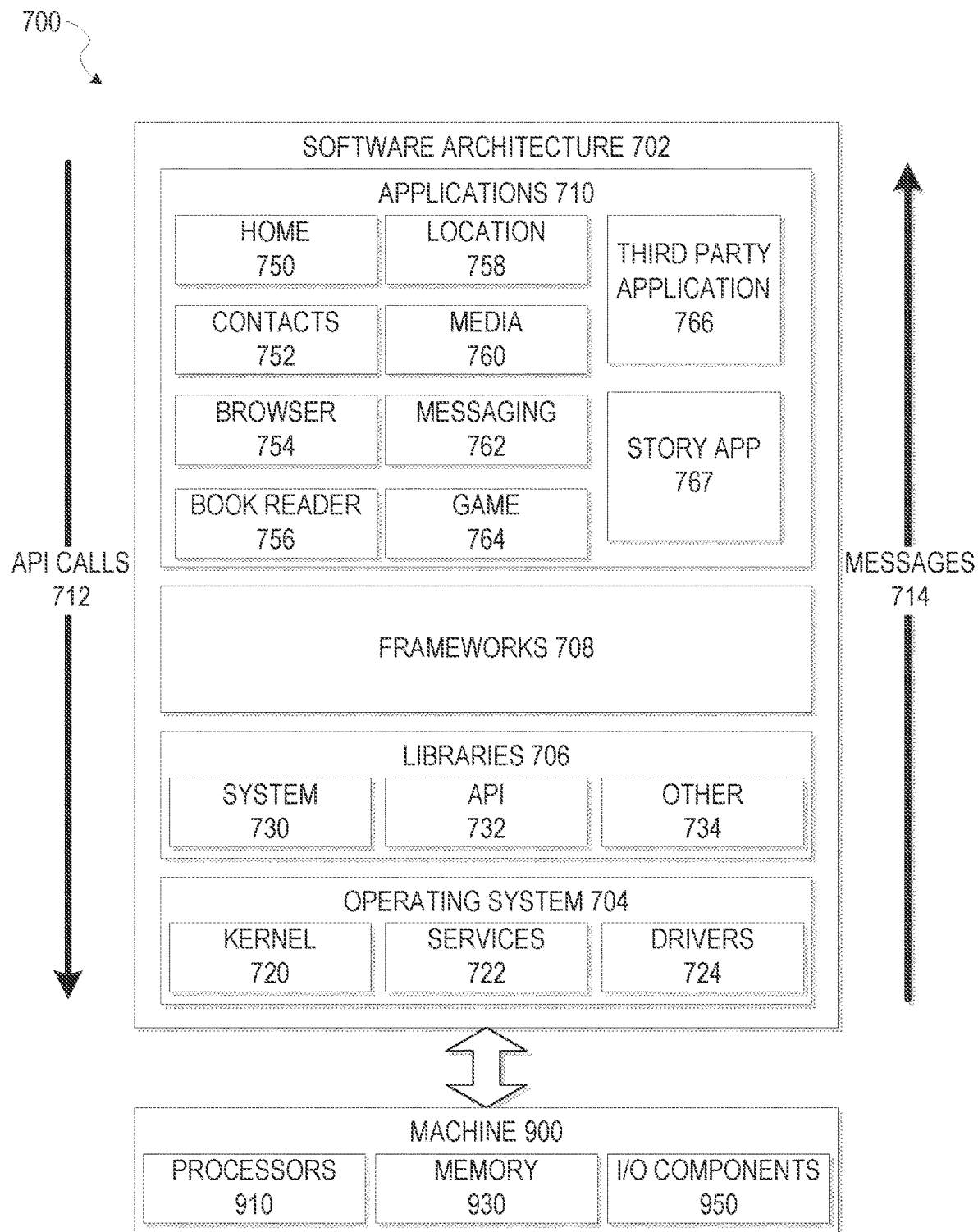
FIG. 7 is a block diagram illustrating an example of a software architecture that may be installed on a machine, according to some example embodiments.

FIG. 7 is a block diagram 700 illustrating architecture of software 702, which can be installed on any one or more of the devices described above. For example, in various embodiments, client devices 110 and 120 and server systems 150, 250, and 550 may be implemented using some or all of the elements of software 702. FIG. 7 is merely a non-limiting example of a software architecture, and it will be appreciated that many other architectures can be implemented to facilitate the functionality described herein. In various embodiments, the software 702 is implemented by hardware such as machine 900 of FIG. 9 that includes processors 910, memory 930, and I/O components 950. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Some embodiments may particularly include a story application 767. In certain embodiments, this may be a stand-alone application that operates to manage communications with a server system such as server system 150. In other embodiments, this functionality may be integrated with another application such as a social media application 760 or another such application. Story application 767 may manage collection of content using a camera device of machine 900, communication with a server system via I/O components 950, and receipt and storage of received stories in memory 930. Presentation of content and user inputs associated with content may be managed by story application 767 using different frameworks 708, library 706 elements, or operating system 704 elements operating on a machine 900.

Figure 8:
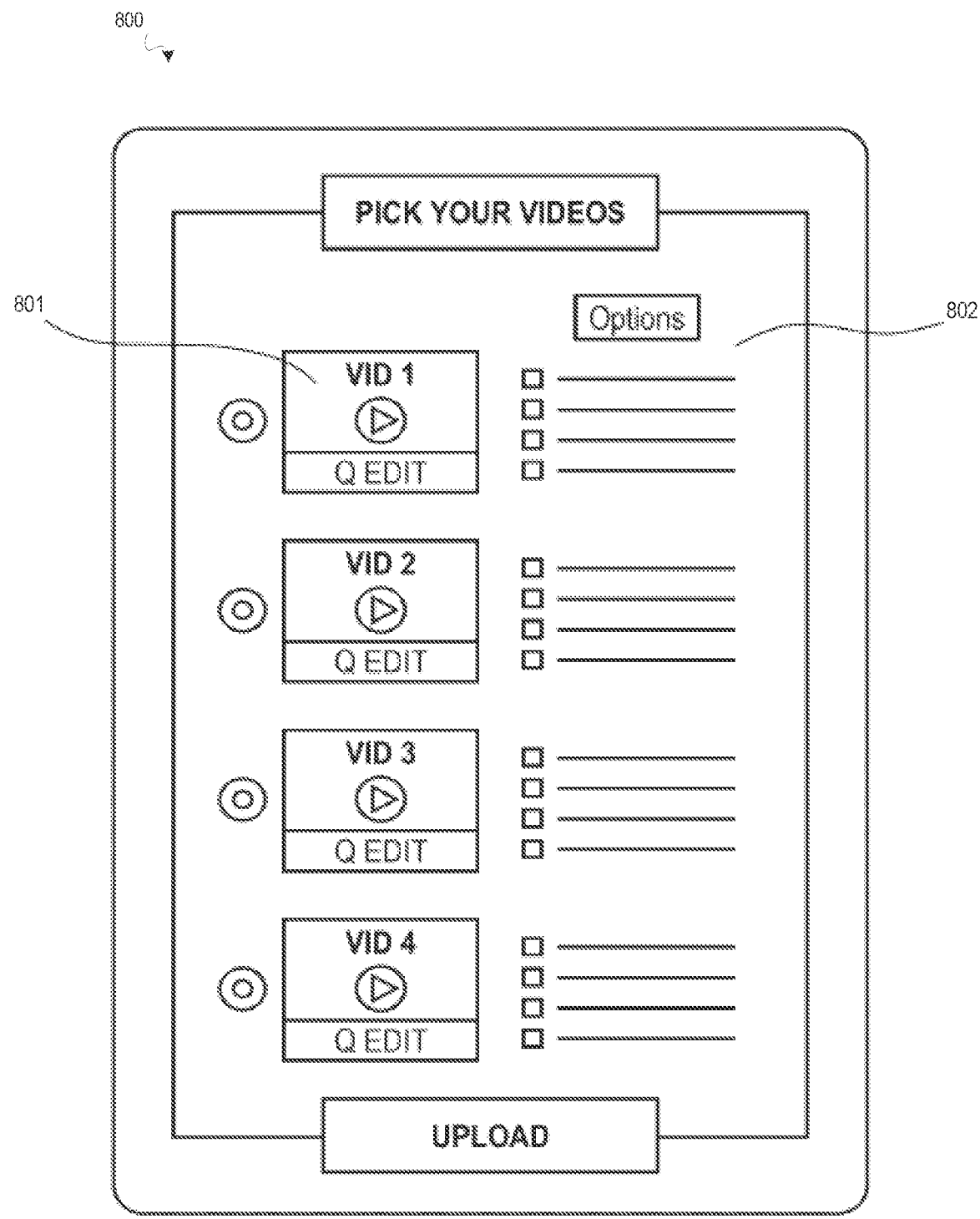
FIG. 8 illustrates an example user interface for a client device operating an application, according to some example embodiments.

FIG. 8 illustrates an example mobile device 800 executing a mobile operating system (e.g., IOS™, ANDROID™, WINDOWS® Phone, or other mobile operating systems), consistent with some embodiments. Mobile device 800 may implement software architecture 702 in certain embodiments. In one embodiment, the mobile device 800 includes a touch screen operable to receive tactile data from a user. The illustrated embodiment of mobile device 800 shows a plurality of images or videos presented as part of a story, with each piece of content have additional associated options and information. FIG. 8 particularly shows content 801 and associated information 802. For example, content 801 may be similar to content LA7. Associated information 802 may include multiple different details or content characteristics associated with content 801. A user selecting content 801 to generate a sub-story may select from the content characteristics or provide additional information related to the desired characteristics for a sub-story based on additional information 802 associated with content 801. The user may physically touch the mobile device 800, and in response to the touch, the mobile device 800 may determine tactile data such as touch location, touch force, or gesture motion. This input may then be sent to a server system to generate a sub-story and communicate the sub-story back to mobile device 800. In various example embodiments, the mobile device 800 displays a home screen operable to launch applications 710 or otherwise manage various aspects of the mobile device 800. In some example embodiments, the home screen provides status information such as battery life, connectivity, or other hardware statuses. The user can activate user interface elements by touching an area occupied by a respective user interface element. In this manner, the user interacts with the applications 710 of the mobile device 800. For example, touching the area occupied by a particular icon included in the home screen causes launching of an application 710 corresponding to the particular icon.

In certain embodiments, content may be presented within the touch screen of mobile device 800 operating as a client device 110, 120, and a touch input may be used to initiate a communication to a server system 550 to request a sub-story, as described above.

Many varieties of applications 710 (also referred to as "apps") can be executing on the mobile device 800, such as native applications (e.g., applications programmed in Objective-C, Swift, or another suitable language running on IOS™ or applications 710 programmed in Java running on ANDROID™), mobile web applications (e.g., applications 710 written in Hypertext Markup Language-5 (HTML5)), or hybrid applications (e.g., a native shell application 710 that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app such as SNAPCHAT® that, consistent with some embodiments, allows users to send public content to a server system 550, and to receive stories from the server system 550. Such an SNAPCHAT application 710 may additionally enable exchange private ephemeral image and/or video content messages.

Figure 9:
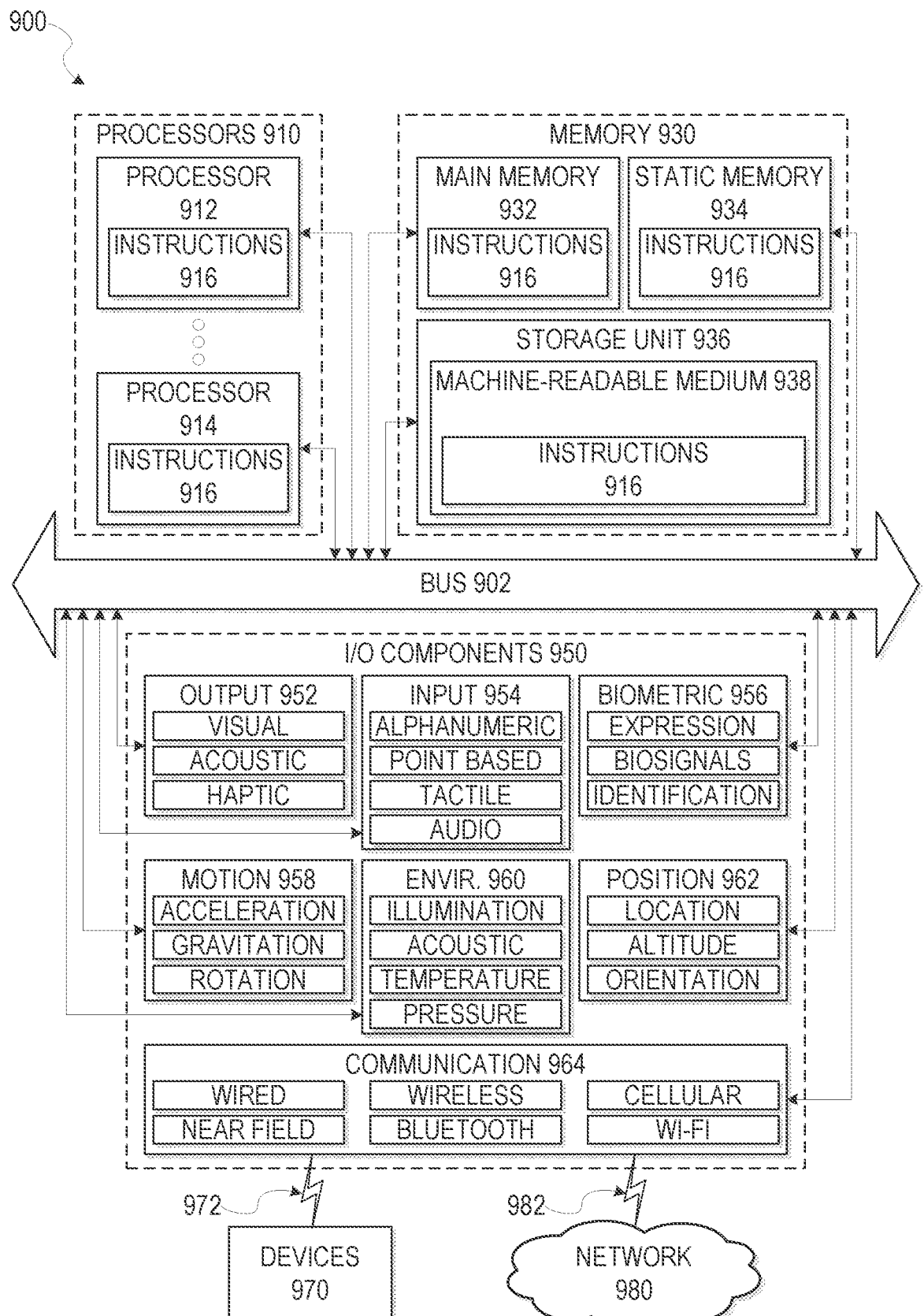
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application 710, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 550 or a client machine 110, 120 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device 800, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 9 shows multiple processors 910, the machine 900 may include a single processor 910 with a single core, a single processor 910 with multiple cores (e.g., a multi-core processor 910), multiple processors 912, 914 with a single core, multiple processors 910, 912 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, at a server system, a plurality of content items comprising a first plurality of video clips;
processing, by the server system the first plurality of video clips to determine a first plurality of content characteristics for the first plurality of video clips;
generating, by the server system, first content collection, the first content collection comprising a second plurality of video clips selected from the first plurality of video clips, wherein the second plurality video clips are selected from the first plurality of video clips based on the plurality of content characteristics and a first geographic visibility area, the first geographic visibility area based on locations associated with the first plurality of video clips;
communicating the first content collection to one or more client devices;
receiving, at the server system, a communication from a client device of the one or more client devices indicating a selection of a video clip of the second plurality of video clips;
determining a second geographic visibility area based on the communication and communications from the one or more client devices;
generating, by the server system, a second content collection, wherein the second content collection comprises a third plurality of video clips, wherein the third plurality of video clips are selected from the first plurality of video clips based on having one or more content characteristics in common with the selected video clip and the second geographic visibility area;
causing the second content collection to be communicated to the client device;
receiving, at the server system, a plurality of communications from the client device indicating selections of a fourth plurality of video clips of the third plurality of video clips;
processing, by the server system the fourth plurality of video clips to determine a second plurality of content characteristics for the fourth plurality of video clips;
determining, based on selections of the first plurality of video clips by the client device and a plurality of other client devices, a feedback baseline values for the first plurality of video clips;
generating, by the server system, a third content collection, wherein the third content collection comprises a fifth plurality of video clips, wherein the fifth plurality of video clips are selected from the first plurality of video clips based on the second plurality of content characteristics and further based on comparing feedback received for the videos of the first plurality of video clips with the feedback baseline values for the first plurality of video clips; and
causing the third content collection to be communicated to the client device.

2. The method of claim 1 wherein the processing further comprises:
processing, by the server system using machine vision, the first plurality of video clips to determine the first plurality of content characteristics for the first plurality of video clips.

3. The method of claim 1 further comprising:
receiving the plurality of content items from a plurality of client devices, wherein the plurality of content items are captured by image sensors of the plurality of client devices, and wherein the plurality of content items comprise a location associated with a corresponding content item, and a time associated with the corresponding content item.

4. The method of claim 3 wherein the plurality of client devices comprises the one or more client devices.

5. The method of claim 1 wherein the plurality of content characteristics comprises one or more of:
a local content geolocation area;
a content time period;
one or more content quality metrics; or
one or more content categories.

6. The method of claim 1 further comprising:
receiving, from the client device, a client device location;
communicating at least two video clips of the first plurality of video clips to the client device, wherein the at least two video clips wherein each of the at least two video clips is associated with a visibility area, and wherein the visibility area for each of the at least two video clips encompasses the client device location.

7. The method of claim 6 wherein the visibility area is a first visibility area and wherein the method further comprises:
receiving, at the server system, a plurality of communications from the client device indicating selections of a fourth plurality of video clips of the third plurality of video clips;
processing, by the server system the fourth plurality of video clips to determine a second visibility area;
generating, by the server system, a third content collection, wherein the third content collection comprises a fifth plurality of video clips, wherein the fifth plurality of video clips are selected from the first plurality of video clips based on the second visibility area; and
causing the third content collection to be communicated to the client device.

8. The method of claim 1 wherein the communication is a first communication and wherein the method further comprises:
receiving, at the server system, a second communication from the client device, the second communication indicating a selection of a video clip of the third plurality of video clips;
processing, by the server system the video clip to determine a category for the video clip;
generating, by the server system, a third content collection, wherein the third content collection comprises a fifth plurality of video clips, wherein the fifth plurality of video clips are selected from the first plurality of video clips based on the category; and
causing the third content collection to be communicated to the client device.

9. The method of claim 8 wherein the category is determined based on one or more images included in the video clip.

10. The method of claim 8 wherein the category is a first category and wherein the method further comprises:
processing, by the server system the video clip to determine a second category for the video clip;
generating, by the server system, a fourth content collection, wherein the fourth content collection comprises a sixth plurality of video clips, wherein the sixth plurality of video clips are selected from the first plurality of video clips based on the second category; and
causing the fourth content collection to be communicated to the client device.

11. The method of claim 10 further comprising:
causing to be displaying an indication of the third content collection and the fourth content collection on a display of the client device.

12. A server system comprising:
memory; and
one or more processors coupled to the memory and configured to perform operations comprising:
receiving, at a server system, a plurality of content items comprising a first plurality of video clips;
processing, by the server system the first plurality of video clips to determine a first plurality of content characteristics for the first plurality of video clips;
generating, by the server system, first content collection, the first content collection comprising a second plurality of video clips selected from the first plurality of video clips, wherein the second plurality video clips are selected from the first plurality of video clips based on the plurality of content characteristics and a first geographic visibility area, the first geographic visibility area based on locations associated with the first plurality of video clips;
communicating the first content collection to one or more client devices;
receiving, at the server system, a communication from a client device of the one or more client devices indicating a selection of a video clip of the second plurality of video clips;
determining a second geographic visibility area based on the communication and communications from the one or more client devices;
generating, by the server system, a second content collection, wherein the second content collection comprises a third plurality of video clips, wherein the third plurality of video clips are selected from the first plurality of video clips based on having one or more content characteristics in common with the selected video clip and the second geographic visibility area;
causing the second content collection to be communicated to the client device;
receiving, at the server system, a plurality of communications from the client device indicating selections of a fourth plurality of video clips of the third plurality of video clips,
processing, by the server system the fourth plurality of video clips to determine a second plurality of content characteristics for the fourth plurality of video clips;
determining, based on selections of the first plurality of video clips by the client device and a plurality of other client devices, a feedback baseline values for the first plurality of video clips;
generating, by the server system, a third content collection, wherein the third content collection comprises a fifth plurality of video clips, wherein the fifth plurality of video clips are selected from the first plurality of video clips based on the second plurality of content characteristics and further based on comparing feedback received for the videos of the first plurality of video clips with the feedback baseline values for the first plurality of video clips; and
causing the third content collection to be communicated to the client device.

13. The server system of claim 12 wherein the operations further comprise:

processing, by the server system using machine vision, the first plurality of video clips to determine the first plurality of content characteristics for the first plurality of video clips.

14. The server system of claim 12 wherein the operations further comprise:
receiving the plurality of content items from a plurality of client devices, wherein the plurality of content items are captured by image sensors of the plurality of client devices, and wherein the plurality of content items comprise a location associated with a corresponding content item, and a time associated with the corresponding content item.

15. The server system of claim 14 wherein the plurality of client devices comprises the one or more client devices.

16. A non-transitory computer-readable storage medium that stores instructions for execution by one or more processors of a server system, the instructions to configure the one or more processors to:
receiving, at a server system, a plurality of content items comprising a first plurality of video clips;
processing, by the server system the first plurality of video clips to determine a first plurality of content characteristics for the first plurality of video clips;
generating, by the server system, first content collection, the first content collection comprising a second plurality of video clips selected from the first plurality of video clips, wherein the second plurality video clips are selected from the first plurality of video clips based on the plurality of content characteristics and a first geographic visibility area, the first geographic visibility area based on locations associated with the first plurality of video clips;
communicating the first content collection to one or more client devices;
receiving, at the server system, a communication from a client device of the one or more client devices indicating a selection of a video clip of the second plurality of video clips;
determining a second geographic visibility area based on the communication and communications from the one or more client devices;
generating, by the server system, a second content collection, wherein the second content collection comprises a third plurality of video clips, wherein the third plurality of video clips are selected from the first plurality of video clips based on having one or more content characteristics in common with the selected video clip and the second geographic visibility area;
causing the second content collection to be communicated to the client device;
receiving, at the server system, a plurality of communications from the client device indicating selections of a fourth plurality of video clips of the third plurality of video clips;
processing, by the server system the fourth plurality of video clips to determine a second plurality of content characteristics for the fourth plurality of video clips;
determining, based on selections of the first plurality of video clips by the client device and a plurality of other client devices, a feedback baseline values for the first plurality of video clips;
generating, by the server system, a third content collection, wherein the third content collection comprises a fifth plurality of video clips, wherein the fifth plurality of video clips are selected from the first plurality of video clips based on the second plurality of content characteristics and further based on comparing feedback received for the videos of the first plurality of video clips with the feedback baseline values for the first plurality of video clips; and causing the third content collection to be communicated to the client device.

17. A non-transitory computer-readable storage medium of claim 16 wherein the instruction further configure the one or more processors to:

process, by the server system using machine vision, the first plurality of video clips to determine the first plurality of content characteristics for the first plurality of video clips.

* * * * *